(12) United States Patent
Fallahmohammadi et al.

(10) Patent No.: US 11,656,417 B2
(45) Date of Patent: *May 23, 2023

(54) FLEXIBLE OPTICAL-FIBER RIBBON

(71) Applicant: Prysmian S.p.A., Milan (IT)

(72) Inventors: Ehsan Fallahmohammadi, Columbia, SC (US); Clint Nicholaus Anderson, West Columbia, SC (US); Brian G. Risch, Granite Falls, NC (US); Andrea Terry, Charlotte, NC (US); John R. Sach, Chapin, SC (US); Jeffrey Scott Barker, Statesville, NC (US); Ryan Truong, Hickory, NC (US)

(73) Assignee: Prysmian S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,866

(22) Filed: Feb. 3, 2022

(65) Prior Publication Data
US 2022/0155540 A1 May 19, 2022

Related U.S. Application Data

(63) Continuation of application No. 16/856,268, filed on Apr. 23, 2020, now Pat. No. 11,256,051, which is a continuation-in-part of application No. 16/247,008, filed on Jan. 14, 2019, now Pat. No. 10,782,495.

(30) Foreign Application Priority Data

Jan. 15, 2018 (WO) ................ PCT/EP2018/050899

(51) Int. Cl.
*G02B 6/44* (2006.01)

(52) U.S. Cl.
CPC .................. *G02B 6/4403* (2013.01)

(58) Field of Classification Search
CPC .................................. G02B 6/4403
USPC .......................................... 385/24
See application file for complete search history.

(56) References Cited

U.S. PATENT DOCUMENTS

| | | |
|---|---|---|
| 5,682,454 A | 10/1997 | Gaillard |
| 5,720,908 A | 2/1998 | Gaillard |
| 5,966,489 A | 10/1999 | Harwell et al. |
| 6,381,390 B1 | 4/2002 | Hutton et al. |
| 7,623,747 B2 | 11/2009 | de Montmorillon et al. |

(Continued)

FOREIGN PATENT DOCUMENTS

| | | |
|---|---|---|
| DE | 3914014 A | 11/1990 |
| EP | 1043613 A1 | 10/2000 |

(Continued)

OTHER PUBLICATIONS

International Search Report and Written Opinion in priority International Application No. PCT/EP2018/050899, dated Oct. 1, 2018, pp. 1-12.

(Continued)

*Primary Examiner* — Jerry M Blevins
(74) *Attorney, Agent, or Firm* — Additon, Pendleton & Witherspoon, P.A.

(57) ABSTRACT

An optical-fiber ribbon having excellent flexibility, strength, and robustness facilitates separation of an optical fiber from the optical-fiber ribbon without damaging the optical fiber's glass core, glass cladding, primary coating, secondary coating, and ink layer, if present.

20 Claims, 13 Drawing Sheets

(56) References Cited

U.S. PATENT DOCUMENTS

| | | |
|---|---|---|
| 7,889,960 B2 | 2/2011 | de Montmorillon et al. |
| 8,145,025 B2 | 3/2012 | De Montmorillon et al. |
| 8,265,442 B2 | 9/2012 | Overton |
| 8,467,647 B2 | 6/2013 | Wells et al. |
| 8,600,206 B2 | 12/2013 | Overton |
| 9,086,555 B2 | 7/2015 | Namazue et al. |
| 9,389,386 B2 | 7/2016 | Matsuzawa et al. |
| 9,541,722 B2 | 1/2017 | Sajima et al. |
| 10,185,105 B2 | 1/2019 | Risch et al. |
| 10,782,495 B2 | 9/2020 | Fallahmohammadi et al. |
| 10,884,213 B1 | 1/2021 | Fallahmohammadi et al. |
| 11,169,342 B2 | 11/2021 | Fallahmohammadi et al. |
| 11,256,051 B2 * | 2/2022 | Fallahmohammadi ................ G02B 6/4403 |
| 2003/0118301 A1 | 6/2003 | Hurley et al. |
| 2010/0254654 A1 * | 10/2010 | Collier ................ H01S 5/02253 385/33 |
| 2010/0254658 A1 | 10/2010 | Tanaka et al. |
| 2011/0058779 A1 | 3/2011 | Wells et al. |
| 2011/0110635 A1 | 5/2011 | Toge et al. |
| 2013/0156390 A1 | 6/2013 | Matsuzawa et al. |
| 2016/0161692 A1 | 6/2016 | Namazue et al. |
| 2016/0299310 A1 | 10/2016 | Kaneko et al. |
| 2016/0356976 A1 * | 12/2016 | Saji ........................ G02B 6/448 |
| 2017/0090135 A1 | 3/2017 | Sato et al. |
| 2017/0115461 A1 | 4/2017 | Namazue et al. |
| 2017/0184803 A1 | 6/2017 | Namazue et al. |
| 2017/0219792 A1 | 8/2017 | Debban et al. |
| 2018/0031792 A1 | 2/2018 | Risch et al. |
| 2018/0320003 A1 | 11/2018 | Chen |
| 2018/0371298 A1 | 12/2018 | Schmid et al. |
| 2019/0250347 A1 | 8/2019 | Fallahmohammadi et al. |
| 2020/0379198 A1 | 12/2020 | Fallahmohammadi et al. |

FOREIGN PATENT DOCUMENTS

| | | |
|---|---|---|
| EP | 2770357 A1 | 8/2014 |
| FR | 2693560 A1 | 1/1994 |
| JP | 2003-232972 A | 8/2003 |
| JP | 2003-241041 A | 8/2003 |
| JP | 2010-44336 A | 2/2010 |
| JP | 2011-221199 A | 11/2011 |
| JP | 2012-027129 A | 2/2012 |
| JP | 2012-027130 A | 2/2012 |
| JP | 2012-103341 A | 5/2012 |
| JP | 2014-010439 A | 1/2014 |
| JP | 2014-052519 A | 3/2014 |
| JP | 2015-021734 A | 2/2015 |
| JP | 2015-108756 A1 | 6/2015 |
| JP | 2016-075746 A | 5/2016 |
| JP | 2017-062431 A | 3/2017 |
| JP | 2017-134360 A | 8/2017 |
| JP | 2017-181513 A | 10/2017 |
| RU | 2619397 C1 | 5/2017 |
| WO | 2012/023508 A1 | 2/2012 |
| WO | 2012/165371 A1 | 12/2012 |
| WO | 2017/175414 A1 | 10/2017 |
| WO | 2019/011417 A1 | 1/2019 |
| WO | 2019/011418 A1 | 1/2019 |
| WO | 2019/137627 A1 | 7/2019 |
| WO | 2019/137628 A1 | 7/2019 |

OTHER PUBLICATIONS

LOCTITE Technical Data Sheet, "Loctite 3341", www.henkel.com/industrial, Oct. 2005, pp. 1-4.

DSM Product Data Sheet, "Cableite 9D9-287", Mar. 2007, www.dsmdesotech.com, pp. 1-2.

DSM Product Data Sheet, "Cableite 9D9-464", (no date) p. 1.

DSM Product Data Sheet, "Cableite 9D9-518", Mar. 2007, Elgin, IL, pp. 1-3.

LOCTITE Technical Data Sheet, "Loctite SI 5240", www.henkel.com/industrial, Jan. 2015, pp. 1-4.

International Preliminary Report on Patentability in priority International Application No. PCT/EP2018/050899, dated Jul. 21, 2020, pp. 1-6.

* cited by examiner

FLEXIBLE OPTICAL-FIBER RIBBON

CROSS-REFERENCE TO PRIORITY APPLICATIONS

This application is a continuation of U.S. patent application Ser. No. 16/856,268 (filed Apr. 23, 2020, and published Dec. 10, 2020, as U.S. Patent Application Publication No. US2020/0386961 A1), now U.S. Pat. No. 11,256,051, which is a continuation-in-part of U.S. patent application Ser. No. 16/247,008 (filed Jan. 14, 2019, and published Aug. 15, 2019, as U.S. Patent Application Publication No. US2019/0250347 A1), now U.S. Pat. No. 10,782,495, which itself claims priority via 35 U.S.C. § 365(a) to International Application No. PCT/EP2018/050899 (filed Jan. 15, 2018, and published Jul. 18, 2019, as International Publication No. WO 2019/137628 A1). Each of the foregoing commonly assigned patent applications, patent application publications, and patents is hereby incorporated by reference in its entirety.

FIELD OF THE INVENTION

The present invention relates to optical-fiber ribbons and methods for producing optical-fiber ribbons.

BACKGROUND

The amount of data transmitted over optical fiber cables is continuously increasing worldwide. This is especially so in data centers because of the expansion of cloud computing, which requires that data be received and transmitted in limited physical space. As such, there is an increasing demand for high-fiber-count and high-fiber-density optical cables. Moreover, there is constant desire to reduce construction costs of access cable networks, making the reduction of optical-cable diameter and weight central to the use of existing facilities (e.g., underground ducts) to reduce installation costs. Another practical requirement is the ability to mass-fusion splice optical fibers to shorten the time required for connecting cables. This means that there are several—possibly conflicting—demands, such as decreasing optical-cable diameters, increasing optical-fiber density, and improving optical-cable workability. This is a serious and difficult challenge for optical-cable manufacturers.

To achieve easy workability, optical-fiber ribbons can preferentially be mass-fusion spliced to simultaneously make multiple optical-fiber connections. Conventional optical-fiber ribbons have the disadvantage of rigidity, however, because of the application of a resin layer around the optical-fiber assembly to keep the optical fibers in a parallel plane. This rigidity limits the possibility of increasing fiber density in optical-fiber cables.

SUMMARY

Accordingly, it is an exemplary object of the present invention to provide an optical-fiber ribbon having excellent flexibility, strength, and robustness to facilitate rolling or folding of the constituent optical fibers in the ribbon-width direction. It is another exemplary object of the present invention to provide an optical-fiber ribbon that can be mass-fusion spliced to make multiple optical-fiber connections. It is yet another exemplary object of the present invention to provide an optical-fiber ribbon from which individual optical fibers (e.g., at most three optical fibers encapsulated with a matrix material) can be separated without damaging adjacent optical fibers.

One or more of these objects may be achieved in a first inventive aspect by exemplary methods of making optical-fiber ribbons.

One exemplary method of making an optical-fiber ribbon includes these steps:

(i) arranging a plurality of optical fibers into a longitudinal optical-fiber assembly (e.g., a planar optical-fiber assembly), wherein the plurality of optical fibers are substantially parallel and respectively adjacent to each other, and wherein each optical fiber includes, from its center to its periphery, a glass core, a glass cladding, a primary coating, a secondary coating, and an outer layer formed of a first curable resin that is less than completely cured (e.g., partly cured or substantially fully cured);

(ii) applying a second curable resin to a surface of the optical-fiber assembly, wherein the second curable resin forms a plurality of successive elongated rectilinear beads configured to form bonds (e.g., elongated bonds) between adjacent optical fibers in the optical-fiber assembly; and (iii) passing the optical-fiber assembly with the surficial, elongated rectilinear beads through a curing station to cure the second curable resin and to further cure the first curable resin.

Another exemplary method of making an optical-fiber ribbon includes these steps:

(i) arranging a plurality of optical fibers into a longitudinal optical-fiber assembly (e.g., a planar optical-fiber assembly), wherein the plurality of optical fibers are substantially parallel and respectively adjacent to each other, and wherein each optical fiber includes, from its center to its periphery, a glass core, a glass cladding, a primary coating, and an outer layer formed of a first curable resin that is either completely cured or less than completely cured (e.g., partly cured or substantially fully cured);

(ii) applying a second curable resin to a surface of the optical-fiber assembly, wherein the second curable resin forms a plurality of successive elongated rectilinear beads configured to form bonds (e.g., elongated bonds) between adjacent optical fibers in the optical-fiber assembly; and (iii) passing the optical-fiber assembly with the surficial, elongated rectilinear beads through a curing station to cure the second curable resin and, optionally, to further cure the first curable resin (e.g., if the first curable resin is less than completely cured).

One or more of these objects may be achieved in a second inventive aspect by an exemplary optical-fiber ribbon that includes (i) a plurality of respectively adjacent optical fibers extending in a longitudinal direction and arranged in parallel to form an optical-fiber assembly (e.g., a planar optical-fiber assembly) and (ii) a plurality of successive elongated rectilinear beads of a second cured resin (i.e., a cured second curable resin) arranged along the length of the optical-fiber assembly (i.e., arranged lengthwise along the optical-fiber assembly). Typically, each bead is configured to form an elongated bond between two adjacent optical fibers in the optical-fiber assembly, and the cured second curable resin of each elongated bond is coupled (e.g., chemically coupled) to a respective first cured resin (i.e., the cured first curable resin) of two adjacent optical fibers.

As noted with respect to a related exemplary method, each optical fiber may include, from its center to its periphery, a glass core, a glass cladding, a primary coating, a secondary coating, and an outer layer formed of a cured first curable resin. In this exemplary optical-fiber embodiment, the outer layer (e.g., an outer release layer, such as a sacrificial, outer release layer) is the outermost optical-fiber coating layer, which contiguously surrounds either the secondary coating or, if present, an ink layer. Here, the partly cured or substantially fully cured first curable resin is cured during the manufacture of the optical-fiber ribbon, either before or concurrently with the curing of the second curable resin—the second curable resin being configured to bond or otherwise join adjacent optical fibers. As such, corresponding embodiments of the optical-fiber ribbon herein disclosed are applicable to the related exemplary method for making an optical-fiber ribbon, and vice versa.

Similarly, as noted with respect to an alternative, related exemplary method, each optical fiber may include, from its center to its periphery, a glass core, a glass cladding, a primary coating, and an outer layer formed of a cured first curable resin. In this optical-fiber embodiment, the cured first curable resin can be a secondary coating (e.g., a colored secondary coating contiguously surrounding the primary coating) or an ink layer (e.g., a colored ink layer contiguously surrounding the secondary coating). Here, too, a partly cured or substantially fully cured first curable resin may be cured during the manufacture of the optical-fiber ribbon, either before or concurrently with the curing of the second curable resin—the second curable resin being configured to bond or otherwise join adjacent optical fibers. As such, corresponding embodiments of the optical-fiber ribbon herein disclosed are applicable to the related exemplary method for making an optical-fiber ribbon, and vice versa.

An exemplary optical-fiber ribbon according to the present invention thus has multiple optical fibers arranged in parallel and connected with other optical fibers in the optical-fiber assembly via cured resin beads. In some embodiments, a connection (e.g., a chemical coupling) is created between the first curable resin, which is the outermost coating layer of the optical fibers, and the second curable resin, which is typically applied to the optical-fiber assembly in elongated rectilinear beads. For example, where the first curable resin is partly cured (e.g., significantly less than fully cured), the concurrent curing of the first curable resin and the second curable resin provides increased bonding strength between the second curable resin and the optical fibers' first curable resin. Conversely, where the first curable resin is substantially fully cured, the subsequent curing of the second curable resin provides decreased bonding strength between the second curable resin and the optical fibers' first curable resin. The relative strength of the coupling between the first curable resin and the second curable resin affects the robustness of the optical-fiber ribbon and the ease by which optical fibers can be separated from the optical-fiber ribbon.

In this regard, when an optical fiber is to be peeled or otherwise removed from the optical-fiber ribbon, no damage ought to occur to the principal structure of the optical fibers. Accordingly, it is preferred that the separation (e.g., failure or rupture) occur (i) within the elongated beads formed by the cured, second curable resin, (ii) at the interface between the cured, second curable resin and the cured, first curable resin, (iii) within the optical fiber's outer layer formed by the cured, first curable resin, or (iv) at the interface between the cured, first curable resin and the optical fiber's next contiguous layer, typically the secondary coating or, if present, an optional ink layer positioned upon the secondary coating. To maintain the integrity of the optical fiber, it would be undesirable if the point of failure or rupture during optical-fiber peel-off were to occur, for example, within the optional ink layer, the secondary coating, or at the secondary coating's interface with the primary coating. This kind of peel-off failure could be considered unacceptable damage to the optical fiber.

The foregoing illustrative summary, other objectives and/or advantages of the present disclosure, and the manner in which the same are accomplished are further explained within the following detailed description and its accompanying drawings.

Definitions

The following definitions are used in the present description and claims to define the stated subject matter. Other terms not cited (below) are intended to have the generally accepted meaning in the field:

"Optical-fiber assembly" as used in the present description means: a loose arrangement of the plurality of parallel adjacent optical fibers with no bonding between the fibers; the assembly has a width (W) and interstices or grooves between adjacent optical fibers.

"Assembly width (W)" or "width (W)" as used in the present description means: the assembly is formed of a number (N) of optical fibers, each having a diameter (D) and a length (L), whereby the assembly has a nominal width (i.e., W=D×N).

"Bond" as used in the present description means: a bead of a second cured resin (i.e., a cured second curable resin) that bonds two adjacent optical fibers over a bonding length (l). It should be noted that if two (or more) subsequent beads are applied one after another within the same groove connecting the same two adjacent optical fibers, these two (or more) beads are considered to form together a bond with a bonding length (l) equal to the sum of the length of such subsequent beads.

"Bonding material" as used in the present description means: the material of which a bond is formed. This is the second cured resin—or when not yet cured—the second curable resin.

"Outer layer material" as used in the present description means: the material of which the outer layer is formed. This is the first curable resin that, depending on the stage of the process, is uncured, partly cured, or fully cured.

"Chemically coupled" as used in the present description means: the presence of chemical covalent bonds formed by the simultaneous curing of the second curable resin and the partly cured first curable resin. These resins each comprise a plurality of chemically active groups that form crosslinks (e.g., chemical bonds) during curing; because of the simultaneous curing at the interface of the beads (i.e., comprising the second curable resin) and the outer layer (i.e., comprising the first curable resin), chemical covalent bonds form between the chemically active groups present in the second curable resin (e.g., in the beads) and the partly cured first curable resin (e.g., in the outer layer).

"Stepwise pattern" as used in the present description means: a pattern constituted by a succession of beads over the plurality of optical fibers, wherein the beads (of the succession of beads) are each time spaced apart in the width direction at a distance of one optical fiber. As such, the step of the stepwise pattern is one optical fiber. Where the optical-fiber assembly is formed by a number (N) of optical fibers, an individual stepwise pattern is constituted by a succession of (N−1) beads.

"Zig-zag like arrangement" as used in the present description means: an arrangement following the trace of a triangle wave. The zig-zag like arrangement in the present application is obtained by fitting a line through mid-points of the subsequent beads of subsequent stepwise patterns.

"Saw-tooth like arrangement" as used in the present description means: an arrangement following the trace of a saw-tooth wave. The saw-tooth like arrangement in the present application is obtained by fitting a line through mid-points of the subsequent beads of subsequent stepwise patterns.

"Pitch (P)" as used in the present description means: a length equal to the recurrence of the stepwise pattern in the same width direction.

BRIEF DESCRIPTION OF THE DRAWINGS

The present invention is described hereinafter with reference to the accompanying drawings in which embodiments of the present invention are shown and in which like reference numbers indicate the same or similar elements. The drawings are provided as examples, may be schematic, and may not be drawn to scale. The present inventive aspects may be embodied in many different forms and should not be construed as limited to the examples depicted in the drawings.

FIG. 2b depicts in a perspective view an exemplary embodiment of an inventive optical-fiber ribbon having an intermittent, discontinuous zig-zag like arrangement with a different bonding length than the exemplary embodiment depicted in FIG. 2a.

DETAILED DESCRIPTION

Various aspects and features are herein described with reference to the accompanying figures. Details are set forth to provide a thorough understanding of the present disclosure. It will be apparent, however, to those having ordinary skill in the art that the disclosed optical-fiber ribbons and methods for producing optical-fiber ribbons may be practiced or performed without some or all of these specific details. As another example, features disclosed as part of one embodiment can be used in another embodiment to yield a further embodiment. Sometimes, well-known aspects have not been described in detail to avoid unnecessarily obscuring the present disclosure. This detailed description is therefore not to be taken in a limiting sense, and it is intended that other embodiments are within the spirit and scope of the present disclosure.

In a first aspect, the invention embraces a method of producing an optical-fiber ribbon, such as the optical-fiber ribbons 100-600 depicted in FIGS. 1-6. Several exemplary embodiments of the method are discussed (below) with reference to the figures, including the process schematic depicted in FIG. 7.

Figure 1:
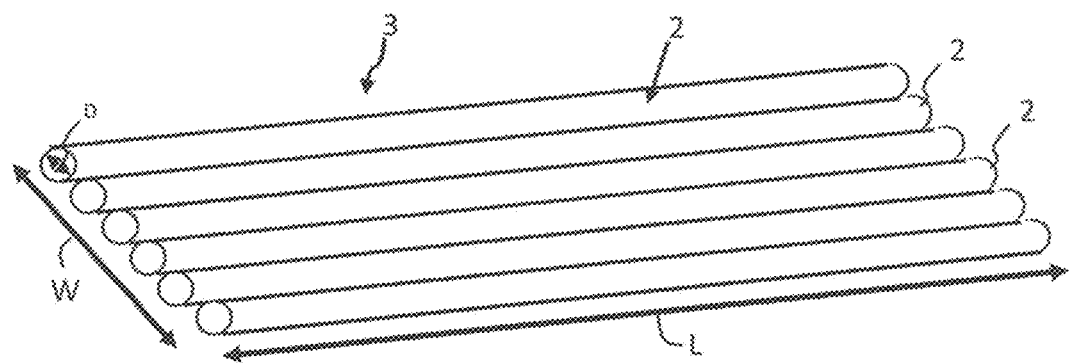
FIG. 1 depicts in a perspective view a representative optical-fiber assembly.
Figure 7:
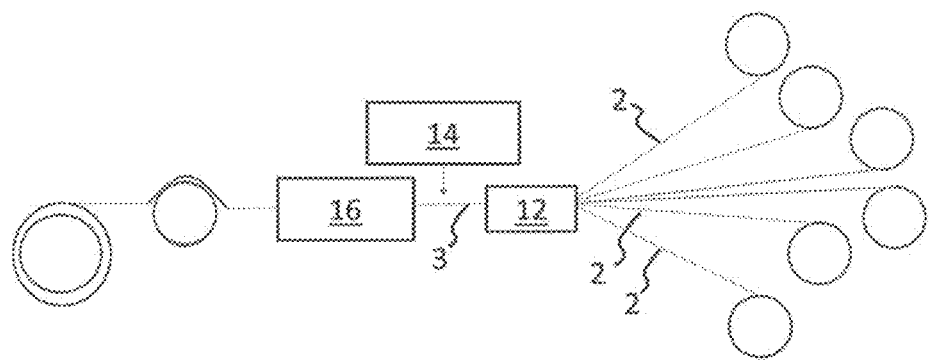
FIG. 7 depicts in a schematic representation an exemplary process for preparing an optical-fiber ribbon having six optical fibers.

In a first exemplary step, a plurality of fibers 2 are fed (e.g., into a die 12) to provide a longitudinal optical-fiber assembly 3 in which the plurality of optical fibers are substantially in parallel and respectively adjacent to each other. The exemplary process is depicted in FIG. 7 (processing from right to left) and the optical-fiber assembly 3 is shown in FIG. 1. In an exemplary embodiment, shown in FIG. 1, the optical fibers are arranged parallel in a plane. Each optical fiber typically has a substantially circular cross section. In some exemplary embodiments, the outer layer of the plurality of optical fibers includes a partly cured first curable resin. In other exemplary embodiments, the outer layer of the plurality of optical fibers includes a substantially fully cured first curable resin. In alternative exemplary embodiments, the outer layer of the plurality of optical fibers includes a completely cured first curable resin.

In a second exemplary step, a second curable resin is applied from a dispenser 14 (or similar dispensing device) to a surface, such as the upper surface of the optical-fiber assembly 3. See FIG. 7. The application of the second curable resin leads to the second curable resin forming a pattern of a plurality of intermittently arranged beads 4 along the upper surface of the optical-fiber assembly 3.

In a third exemplary step, the optical-fiber assembly with beads applied thereon is passed through a curing station 16 to cure the second curable resin and, if the first curable resin is less than completely cured (e.g., partly cured or substantially fully cured), to further cure the first curable resin. See FIG. 7.

In an exemplary embodiment, the optical fibers are first drawn and partially coated (e.g., from the application of the primary coating through the application of the secondary coating) and reeled. Next, the plurality of optical fibers are optionally coated with a first curable resin (e.g., an ink layer or release layer) and reeled again. Later, the plurality of optical fibers are consolidated into an optical-fiber ribbon, such as by the process steps schematically depicted in FIG. 7 (i.e., the optical fibers are fed from reels into the ribbon-making process).

In another exemplary embodiment, the optical fibers are first drawn and coated (e.g., from the application of the primary coating through the application of the first curable resin) and then reeled. The plurality of optical fibers are later consolidated into an optical-fiber ribbon, such as by the process steps schematically depicted in FIG. 7 (i.e., the optical fibers are fed from reels into the ribbon-making process).

In an alternative exemplary method embodiment, the optical fibers are first drawn and partially coated (e.g., from the application of the primary coating through the application of the secondary coating) and then reeled. Later, in a continuous process (e.g., an in-line process), the plurality of optical fibers are further coated with a first curable resin (e.g., an ink layer or a release layer) and consolidated into an optical-fiber ribbon, such as by the process steps schematically depicted in FIG. 7.

By way of non-limiting illustration, where the first curable resin is partly cured, the concurrent curing of the first curable resin and the second curable resin provides increased bonding strength between the second curable resin and the optical fibers' first curable resin. Conversely, where the first curable resin is substantially fully cured such that little further curing is possible, the subsequent curing of the second curable resin provides decreased bonding strength between the second curable resin and the optical fibers' first curable resin. As noted, the relative strength of the coupling between the first curable resin and the second curable resin affects the robustness of the optical-fiber ribbon and the ease by which optical fibers can be separated from the optical-fiber ribbon.

Curing the partly cured first curable resin (or the substantially fully cured first curable resin) that forms the optical fiber's outer layer to the second curable resin that forms the bead seems to affect optical-fiber-ribbon robustness and ease of optical-fiber separation from the optical-fiber ribbon. In an exemplary optical-fiber ribbon having optical fibers that include a sacrificial release layer formed of the first curable resin, the point of failure when removing an optical fiber preferably occurs (i) at the interface between the bead (i.e., formed by the second curable resin as cured) and the outer layer (i.e., formed by the first curable resin as cured), (ii) within the sacrificial outer layer itself (i.e., formed by the first curable resin as cured), or (iii) at the interface between the outer layer (i.e., formed by the first curable resin as cured) and the secondary coating layer (or the optional ink layer, if present). In such an exemplary embodiment of the optical-fiber ribbon, the outer layer of the optical fiber (i.e., formed by the first curable resin as cured) can be considered a sacrificial release layer that facilitates the separation of an optical fiber from the optical-fiber ribbon without damaging the optical fiber's principal structural parts, namely the glass core, the glass cladding, the primary coating, the secondary coating, and the optional ink layer, if present.

By way of further example, in one exemplary optical-fiber embodiment, each optical fiber includes an outer ink layer, and so the sacrificial, outer release layer contiguously surrounds this outer ink layer. In another exemplary optical-fiber embodiment, each optical fiber includes a secondary coating with coloring (or identifying markings) such that an additional ink layer is not present, and so the sacrificial, outer release layer contiguously surrounds the secondary coating. In either exemplary optical-fiber embodiment, the "sacrificial, outer release layer" is a distinct coating layer that surrounds the optical fiber's next contiguous layer, which is typically the secondary coating or, if present, an optional ink layer positioned upon the secondary coating.

In an alternative exemplary optical-fiber ribbon having optical fibers in which the first curable resin is either a secondary coating (e.g., a colored secondary coating contiguously surrounding the primary coating) or an ink layer (e.g., a colored ink layer contiguously surrounding the secondary coating), the point of failure when removing an optical fiber preferably occurs (i) within the bead (i.e., formed by the second curable resin as cured) or (ii) at the interface between the bead (i.e., formed by the second curable resin as cured) and the outer layer (i.e., formed by the first curable resin as cured). In such an exemplary embodiment of the optical-fiber ribbon, which excludes a sacrificial, outer release layer, the outermost layer of the optical fiber (i.e., formed by the first curable resin as cured) is a principal structural part of the optical fiber (e.g., the secondary coating or the optional ink layer) and so should remain undamaged after separation of an optical fiber from the optical-fiber ribbon.

In an exemplary method, each bead is arranged to form a bond between two adjacent optical fibers over a bonding length (l). Typically, a bond connects two adjacent optical fibers and a successive bond connects two adjacent optical fibers, at least one of which differs from the optical fibers bonded by the preceding bond. Typically, each bond is separated in longitudinal direction from a successive bond by a bonding distance (d). In an exemplary embodiment, the bonding length is larger than the bonding distance (l>d).

Figure 8:
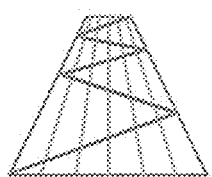
FIG. 8 depicts in a perspective, schematic representation an optical-fiber ribbon having a zig-zag like arrangement.
Figure 9:
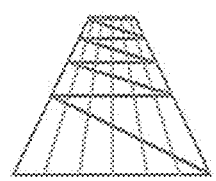
FIG. 9 depicts in a perspective, schematic representation an optical-fiber ribbon having a saw-tooth like arrangement.

FIG. 8 depicts in a perspective, schematic representation an optical-fiber ribbon having six optical fibers and a zig-zag stepwise arrangement of the second curable resin. FIG. 9 depicts in a perspective, schematic representation an optical-fiber ribbon having six optical fibers and a saw-tooth stepwise arrangement of the second curable resin.

In an exemplary embodiment, before feeding (or otherwise arranging) the plurality of optical fibers to provide a longitudinal optical-fiber assembly, a first curable resin of the outer layer of each of the plurality of optical fibers is partly cured to a curing degree of between 85 percent and 95 percent, such as between 88 percent and 92 percent (e.g., about 90 percent cured) or between 91 percent and 94 percent (e.g., about 92 or 93 percent cured), to provide optical fibers having an outer layer of a partly cured first curable resin. In an exemplary embodiment, a degree of curing between 85 percent and 95 percent means a degree of surface curing (i.e., the curing of the outermost portion of the first curable resin of each optical fiber's outer layer). In another exemplary embodiment, before feeding (or otherwise arranging) the plurality of optical fibers to provide a longitudinal optical-fiber assembly, a first curable resin of the outer layer of each of the plurality of optical fibers is partly cured to a curing degree of between about 80 percent and 85 percent. In general, exemplary first curable resins can be tacky or even semi-liquid at a degree of curing less than about 80 percent. Above that curing threshold, the outermost layer formed by the first curable resin is sufficiently cured to promote spooling of the optical fibers on reels, which facilitates later ribbonizing operations, such as depicted in FIG. 7.

In another exemplary embodiment, before feeding (or otherwise arranging) the plurality of optical fibers to provide a longitudinal optical-fiber assembly, a first curable resin of the outer layer of each of the plurality of optical fibers is substantially fully cured to a curing degree of 95 percent or more (e.g., about 96, 97, 98, or 99 percent cured), to provide optical fibers having an outer layer of a substantially fully cured first curable resin.

In an exemplary embodiment, the optical fibers are formed by providing optical fibers each having, from its center to its periphery, a glass core, a glass cladding, and a primary coating, and applying a first curable resin to form an outermost layer. The first curable resin may form (i) a secondary coating (e.g., contiguously surrounding the primary coating), an ink layer (e.g., contiguously surrounding a secondary coating), or a sacrificial release layer (e.g., contiguously surrounding either a secondary coating or, if present, an ink layer). Typically, the first curable resin is then partly cured (e.g., about 85 percent to 90 percent cured or so) or substantially fully cured (e.g., about 95 percent cured or so) to form the optical-fiber ribbon.

The percentage or degree of surface curing may be determined by measuring the peak area using Fourier Transform Infrared (FTIR) of the peak of the chemically active group of the resin (e.g., the peak at 1410 cm$^{-1}$ of an acrylate group for a UV-curable acrylate resin). This peak area is then compared to a reference peak that is nearby the acrylate peak and not changing with cure. For a completely cured sample, the acrylate peak essentially disappears (e.g., a peak of a chemically active group, such as 810 cm$^{-1}$ or 1410 cm$^{-1}$, is not present). The ratio of the relative peaks provides the degree of surface cure.

In an exemplary embodiment, the outer layer of the first curable resin of each optical fiber is partly cured (e.g., 85 to 90 percent cured) in an environment including oxygen. If oxygen is present during curing, the outer surface of the outer layer does not fully cure. Typically, the amount of oxygen surrounding the outer layer during curing is between 500 ppm and 3,500 ppm, such as between 1,000 ppm and 2,000 ppm.

In another exemplary embodiment, the outer layer of the first curable resin of each optical fiber is at least 90 percent cured (e.g., substantially fully cured to more than 95 percent) in a controlled nitrogen-purging environment. For example, the curing station may be purged with industrial-grade nitrogen (e.g., 99.9 mole percent pure) to achieve a high-nitrogen environment (99 mole percent nitrogen). Absent such nitrogen purging, the outer layer of the first curable resin may achieve a lower surface cure, which can sometimes result in excessive bonding (e.g., strong chemical bonding, such as covalent bonding) with the second curable resin. This can hinder separation of one or more optical fibers from the optical-fiber ribbon without damaging the optical fiber's primary coating, secondary coating, or ink layer.

In an exemplary embodiment, the second curable resin, which forms the beads, is applied with a viscosity of between 100 cP and 1000 cP, typically between 100 cP and 400 cP. This allows a sufficient viscous mass to fill the grooves between adjacent optical fibers and will yield, after curing, an optical-fiber ribbon having a flush ribbon bead, thereby reducing possible stresses in the optical-fiber ribbon when rolled or folded. If the viscosity is too low, the material is too thin and runny, and the adhesive will excessively flow between the optical fibers and not form a consistent bond. The viscosity is measured using a Brookfield digital rotational viscometer Model DV-II with RV1 spindle at 10 rpm. The viscosity may be measured at several different temperatures, such as at 23° C. and/or at 30° C. and/or at 40° C. and/or at 50° C. and/or at 60° C., to determine the optimal temperature for the application of the second curable resin material.

In an exemplary embodiment, the second curable resin is heated and applied at a temperature of up to 60° C. (e.g., between about 23° C. and 60° C.). If higher temperatures are used during the preparation of the optical-fiber ribbons, thermal stress might occur in the optical fibers, leading to attenuation (e.g., at a wavelength of 1310 nanometers, 1550 nanometers, and/or 1625 nanometers).

In an exemplary embodiment, the dispenser (or other dispensing device) oscillates in a direction transverse to the longitudinal direction of the optical-fiber assembly. The oscillating device can create a stepwise pattern on one side of the optical-fiber assembly. The tip of the dispenser may oscillate (e.g., vibrate) in a transverse direction at a high frequency, such as between about 100 Hz and 200 Hz. In an exemplary embodiment, the dispenser oscillates in a direction transverse to the longitudinal direction (i.e. in the width direction) of the optical-fiber assembly, and the optical-fiber assembly is moved in longitudinal direction, such as via reels. See FIG. 7.

In an exemplary embodiment, the dispenser may deliver the liquid resin (e.g., the second curable resin) in fine droplets to the moving optical-fiber assembly. Because of surface tension, the liquid resin will flow together to form elongated beads.

In an exemplary embodiment, the curing station emits UV radiation for curing the beads of the second curable resin and for further curing the partly cured first curable resin (or the substantially fully cured first curable resin) for the outer layer of the optical fibers.

In an exemplary embodiment, the first curable resin and/or the second curable resin are one or more curable ultraviolet (UV) resins. In an exemplary embodiment, the curable resins used are the same for the beads and the outer layer. In an exemplary embodiment, the first curable resin is a UV-curable ink having a pigment or dye for coloring. In an exemplary embodiment, a difference between the first curable resin and the second curable resin is the amount of slip or release agent. For example, the first curable resin might include more than 0.5 weight percent release agent or slip agent (e.g., between about 0.5 and 1 weight percent or so), whereas the second curable resin might include less than 0.5 weight percent release agent or slip agent, or none at all.

In a second aspect, the invention embraces an optical-fiber ribbon 100-600, such as depicted in FIGS. 1-6. Several exemplary embodiments of the optical-fiber ribbon are discussed (below) with reference to the figures. In accordance with the present disclosure, the bonding strength between the bead (e.g., formed by the second curable resin) and the optical fibers can be controlled (e.g., via zig-zag like, saw-tooth like, or similar sinusoidal arrangements) to ensure optical-fiber-ribbon integrity during damage-free handling and separation of individual fibers from the optical-fiber ribbon. In some exemplary embodiments of the optical-fiber ribbon, this is achieved by the inclusion of a sacrificial release layer (e.g., an outermost optical-fiber layer formed by the first curable resin) that facilitates the separation of an optical fiber from the optical-fiber ribbon without damaging the optical fiber's structural components, namely the glass core, the glass cladding, the primary coating, the secondary coating, and the optional ink layer, if present. In some other exemplary embodiments of the optical-fiber ribbon (e.g., excluding a sacrificial, outer release layer), this is achieved by controlling the modulus and curing of the bead, which is formed by the second curable resin as cured, and optionally the outermost layer of the optical fiber (e.g., the secondary coating or the optional ink layer formed by the first curable resin as cured).

FIG. 1 depicts in a perspective view a representative optical-fiber assembly 100. This optical-fiber assembly includes a plurality of adjacent optical fibers 2 having a diameter D. The optical fibers are arranged substantially planar in parallel to form a longitudinal optical-fiber assembly 3 having a width W and a length L. This optical-fiber assembly 100 forms the basis for the optical-fiber ribbon according to the present invention.

In an exemplary embodiment, one or more bonds have a bonding length (l) and are spaced apart in a longitudinal direction by a distance (d). For example, the elongated bonds are substantially parallel to the optical fibers in the optical-fiber ribbon. In this exemplary embodiment, the bonding length is larger than the distance (l>d). The effect is that the mechanical properties in terms of robustness are increased, because a larger mechanical bond between the optical fibers is achieved.

In an exemplary embodiment, the bonding length is between about 2 and 20 times the distance (2d≤l≤20d or l/d=2 to 20), wherein the values of 2 and 20 are included. In another exemplary embodiment, the bonding length is between about 4 and 15 times the distance (4d≤l≤15d or l/d=4 to 15), wherein the values of 4 and 15 are included. The bead as applied has an elongated form and will flow into a groove between two adjacent optical fibers. The elongated beads forming a bond may have a width between 75 micrometers and 350 micrometers (e.g., between about 200 micrometers and 275 micrometers, which is similar to the diameter of the optical fibers).

In an exemplary embodiment, the bonding length (l) of a bead is between 1.5 and 20 millimeters. The bonding length of the bead is effectively described by the ratio of bonding length to bonding distance (l/d) and by the ratio of pitch of the stepwise pattern to the width of the optical-fiber assembly (P/W).

In an exemplary embodiment, each of the plurality of optical fibers has substantially the same diameter. In an exemplary embodiment, the optical fiber has a diameter of between 240 micrometers and 260 micrometers, more typically about 250 micrometers. Alternatively, the optical fibers may have a reduced diameter, such as between about 180 micrometers and 230 micrometers. In an exemplary embodiment, the optical-fiber assembly includes between six and 36 optical fibers (including 6 and 36), such as between 12 and 24 optical fibers (including 12 and 24).

In an exemplary embodiment, the point of failure when removing an optical fiber from the optical-fiber ribbon is in the bead (i.e., formed by the second curable resin as cured). In another exemplary embodiment, the point of failure when removing an optical fiber from the optical-fiber ribbon is at the interface between the bead (i.e., formed by the second curable resin as cured) and the outer layer (i.e., formed by the first curable resin as cured). In yet another exemplary embodiment, the point of failure when removing an optical fiber from the optical-fiber ribbon is in the outer layer (i.e., formed by the first curable resin as cured). In yet another exemplary embodiment, the point of failure when removing an optical fiber from the optical-fiber ribbon is at the interface between the outer layer (i.e., formed by the first curable resin as cured) and the secondary coating layer or an ink layer, whichever layer is contiguously surrounded by the outer layer (i.e., formed by the first curable resin as cured).

In an exemplary embodiment, the optical fibers are optical fibers having, in addition to the primary coating and secondary coating, an ink layer (e.g., an ink layer contiguously surrounding the secondary coating) and an outer layer (e.g., the outermost optical-fiber layer formed by the first curable resin). In another exemplary embodiment, the outer layer itself may constitute the ink layer (e.g., the ink layer is formed by the first curable resin and is the outermost optical-fiber layer). In yet another exemplary embodiment, the outer layer itself may constitute the secondary coating (e.g., the secondary coating is formed by the first curable resin and is the outermost optical-fiber layer). In exemplary embodiments in which the outermost optical-fiber layer is an ink layer or a secondary coating, it is desirable that the point of failure occur either within the bead (i.e., formed by the second curable resin as cured) or at the interface between the bead (i.e., formed by the second curable resin as cured) and the outer layer (i.e., formed by the first curable resin as cured). Those having ordinary skill in the art will understand the different kinds of primary coatings, secondary coatings, and ink layers, as well as the structures and thicknesses thereof. This application hereby incorporates by reference commonly owned U.S. Pat. No. 8,265,442 for a Microbend-Resistant Optical Fiber and U.S. Pat. No. 8,600,206 for a Reduced-Diameter Optical Fiber.

In an exemplary embodiment, the beads are arranged on only one side of the optical-fiber assembly. For example, the beads are arranged only on the upper surface of the optical-fiber assembly (i.e., when the optical fibers are arranged in a ribbon-like manner rather than rolled up). The optical-fiber assembly can be viewed as a ribbon-like assembly defining an upper surface, a lower surface, and two side edges. The upper and lower surfaces are not completely flat, because they are formed of a substantially parallel arrangement of optical fibers. As such, the upper and lower surfaces have parallel longitudinal grooves between adjacent optical fibers. The beads are positioned within the grooves formed between adjacent optical fibers. Those having ordinary skill in the art will understand the optical fibers may not be perfectly parallel but rather substantially parallel in practice.

In an exemplary embodiment, two successive beads of the plurality of beads are connected by a transition part of the cured second curable resin. In an exemplary embodiment, the transition part is S-shaped (in a plan view). In an exemplary embodiment, each two successive beads of the plurality of beads are connected by a transition part of the cured second curable resin.

In an exemplary embodiment, a succession of alternating beads and transition parts forms a thread, wherein at each longitudinal position of the optical-fiber assembly there is at most one thread. In an exemplary embodiment, the thread has a mass (in grams) per 10,000 meters of between 60 and 120 dtex, such as between 75 and 110 dtex.

In an exemplary embodiment, each two successive beads of the plurality of beads are free from each other in that no cured second curable resin connects the two successive beads. In other words, there is no thread of resin but merely individual beads.

In an exemplary embodiment, successive beads form a stepwise pattern over the plurality of optical fibers, each step being one optical fiber.

In an exemplary embodiment, the first curable resin and/or the second curable resin are one or more curable ultraviolet (UV) resins. In an exemplary embodiment, the first cured resin and/or the second cured resin are acrylate resins. The first and second cured resins may be the same or different. In an exemplary embodiment, the first curable resin is a UV-curable ink including a pigment or dye for coloring. As noted, in an exemplary embodiment, a difference between the first curable resin and the second curable resin is the amount of slip or release agent. For example, the first curable resin might include more than 0.5 weight percent release agent or slip agent (e.g., between about 0.5 and 2 weight percent, such as about 1 weight percent), whereas the second curable resin might include less than 0.5 weight percent release agent or slip agent, or none at all.

In an exemplary embodiment, the cured second curable resin has an elongation at break of at least 150 percent, typically between 200 percent and 300 percent, such as between 200 percent and 250 percent. In an exemplary embodiment, the cured second curable resin has a modulus of elasticity (or Young's modulus) of between 1 MPa and 50 MPa (e.g., between 5 MPa and 45 MPa), such as between 1 MPa and 10 MPa, between 10 MPa and 20 MPa, between 15 MPa and 30 MPa, or between 20 MPa and 40 MPa. In another exemplary embodiment, the cured second curable resin has a modulus of elasticity (or Young's modulus) of between 1 MPa and 15 MPa, such as between 1 MPa and 10 MPa. In yet another exemplary embodiment, the cured second curable resin has a modulus of elasticity (or Young's modulus) of between 15 MPa and 40 MPa, such as between 20 MPa and 35 MPa (e.g., about 20-25 MPa). In this regard, elongation at break (e.g., strain at break) and modulus of elasticity was measured on a dog-bone-shaped film sample using the following method: ASTM D638-14 ("Standard Test Method for Tensile Properties of Plastics"), which is hereby incorporated by reference in its entirety.

As noted, the outer layer (i.e., formed by the first curable resin as cured) may include release agent to facilitate release of an optical fiber from the optical-fiber ribbon. Conventional ribbon matrix materials that are used to completely surround and encapsulate an optical-fiber assembly include a certain amount of release agent to facilitate breakout of individual fibers or splitting of a fiber ribbon. With respect to the present flexible optical-fiber ribbon according to the present invention, a reduced amount of release agent is employed. Surprisingly, it has been observed that by reducing the amount of release agent (e.g., the release agent in the second curable resin), the point of failure (e.g., the point of breakage) upon removing an optical fiber shifts to the interface between the bead (i.e., formed by the second curable resin as cured) and the outer layer (i.e., formed by the first curable resin as cured) or to the outer layer itself.

In an exemplary embodiment, the thickness of the outer layer (i.e., the sacrificial release layer formed by the first curable resin as cured) is between 2 micrometers and 10 micrometers, such as between 3 micrometers and 5 micrometers or, more typically, between 5 micrometers and 10 micrometers.

Figure 14:
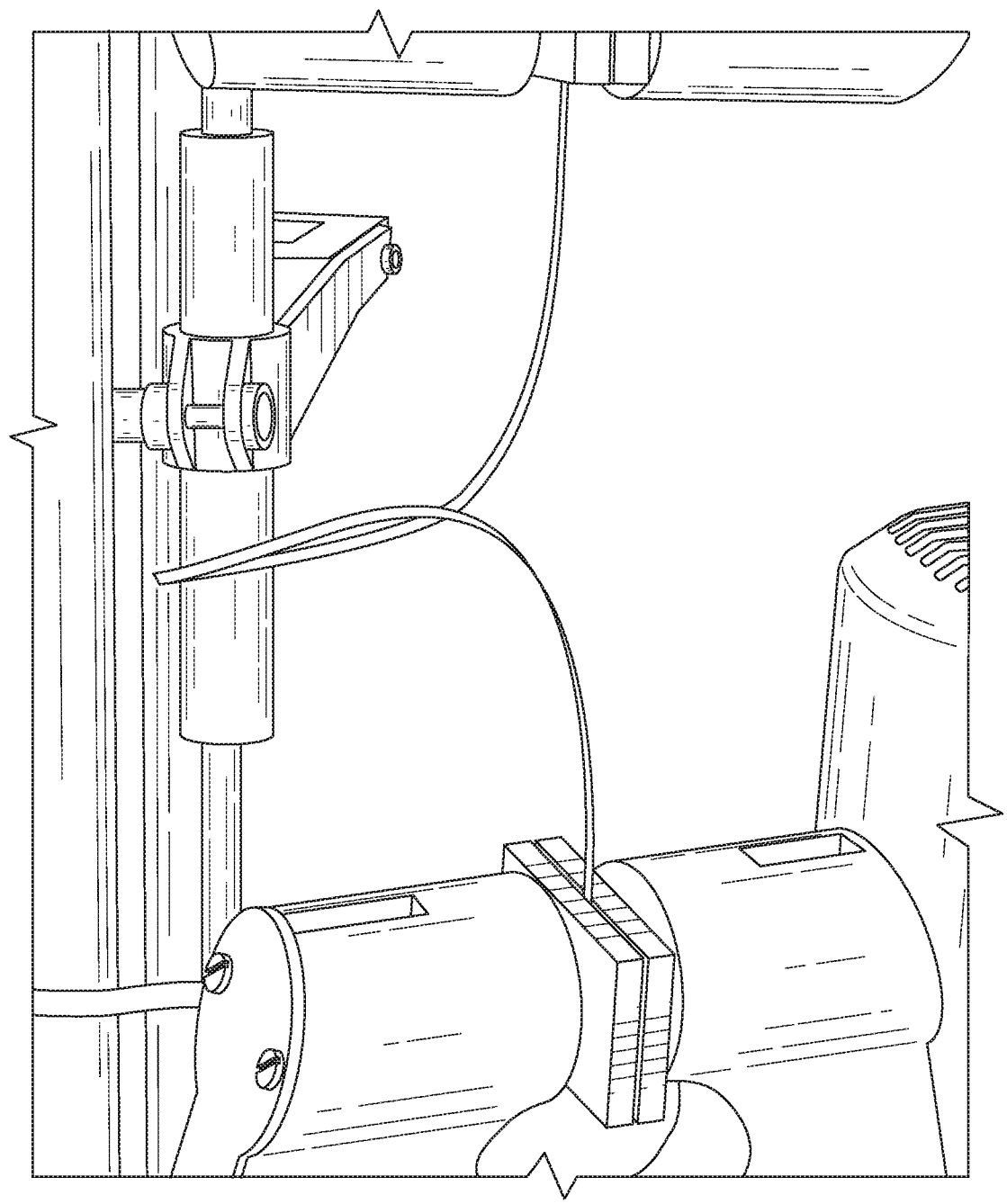
FIG. 14 depicts an optical-fiber ribbon being subjected to mechanical tensile testing, namely a T-peel test.

Ribbon robustness can be tested using a mechanical tester, such as a tensile tester (e.g., Instron 5567). For example, in a T-peel test, a single fiber (or a group of adjacent fibers) from an end of the optical-fiber ribbon is clamped in a grip of the tensile tester (e.g., Instron 5567), while the remaining fibers from the same end of the optical-fiber ribbon are clamped in the opposite grip of the tensile tester. See FIG. 14 (showing the performance of the T-peel test on an optical-fiber ribbon). When both grips move transversely away from each other, the maximum force (N) until separation of the single fiber (or group of fibers) from the remaining fibers determines the bonding strength. In such a T-peel test, which is typically performed at STP (e.g., room temperature and atmospheric pressure), the force to break a single bond (i.e., the required separation force) is measured. In an exemplary embodiment of the optical-fiber ribbon, the force required to separate the optical-fiber ribbon in a T-peel test is between 0.01 N and 0.2 N, such as between 0.01 N and 0.1 N (e.g., between about 0.03 N and 0.1 N, such as between 0.05 N and 0.07 N). For example, the force required to separate 250-micron optical fibers from an optical-fiber ribbon in a T-peel test is typically between about 0.02 N and 0.15 N, and the force required to separate 200-micron optical fibers from an optical-fiber ribbon in a T-peel test is typically between about 0.015 N and 0.1 N. The reduced force for separating 200-micron optical fibers reflects the reduced contact area between the optical fiber (e.g., the outer surface of the first cured resin) and the bead (e.g., the inner surface of the elongated rectilinear bead formed by the second cured resin), which can result from the reduced dimensions of the bead itself (e.g., the width of the elongated rectilinear bead formed by the second cured resin).

Moreover, ribbon robustness and durability can be further evaluated via watersoak testing (herein referred to as "watersoak testing"). For example, after immersion in 60° C. water for at least 30 days (and typically 60 or 90 days or more), bonding strength as measured by the aforementioned T-peel test should be at least 70 percent of the original bonding strength (e.g., 75 percent or more), more typically at least 80 percent of the original bonding strength (e.g., 85 percent or more). (During the T-peel test the optical-fiber ribbon is no longer immersed in the water bath.) Moreover, optical attenuation of each optical fiber in the optical-fiber ribbon should not increase by more than 0.5 dB/km, typically 0.1 dB/km (e.g., less than about 0.05 dB/km), as measured at a wavelength of 1550 nanometers during the period of water immersion and/or after the period of water immersion.

To implement watersoak testing of the present optical-fiber ribbon, 600 meters of loosely coiled optical-fiber ribbon is completely immersed in a bath of 60° C. water for at least 30 days (e.g., 60 days, 90 days, or 125 days). At the end of the water-immersion period, the optical-fiber ribbon is removed from the water reservoir and the bonding strength of the optical-fiber ribbon is measured by the T-peel test. After the requisite period of water immersion, the optical-fiber ribbons according to the present invention maintained bonding strength of more than 70 percent of the original bonding strength (as measured by the T-peel test).

As noted, optical attenuation (e.g., added loss) of each optical fiber in the optical-fiber ribbon can be periodically measured by optical time-domain reflectometer (OTDR) both during and after the water immersion period. The optical-fiber ribbons according to the present invention demonstrated optical attenuation for each constituent optical fiber of less than 0.1 dB/km (as measured at a wavelength of 1550 nanometers) both during and after the period of water immersion.

As explained previously with respect to certain exemplary embodiments, a connection (e.g., a chemical coupling) is created between the first curable resin, which is an outermost coating layer of the optical fibers, and the second curable resin, which is typically applied to the optical-fiber assembly in beads. Where the first curable resin is partly cured (i.e., less than fully cured), the concurrent curing of the first curable resin and the second curable resin provides increased bonding strength between the second curable resin and the optical fibers' first curable resin. Conversely, where the first curable resin is substantially fully cured, the subsequent curing of the second curable resin provides decreased bonding strength between the second curable resin and the optical fibers' first curable resin. The relative strength of the coupling between the first curable resin and the second curable resin affects the robustness of the optical-fiber ribbon and the ease by which optical fibers can be separated from the optical-fiber ribbon (e.g., the properties of optical-fiber-ribbon robustness and optical-fiber separability are typically inversely related).

Figure 12A:
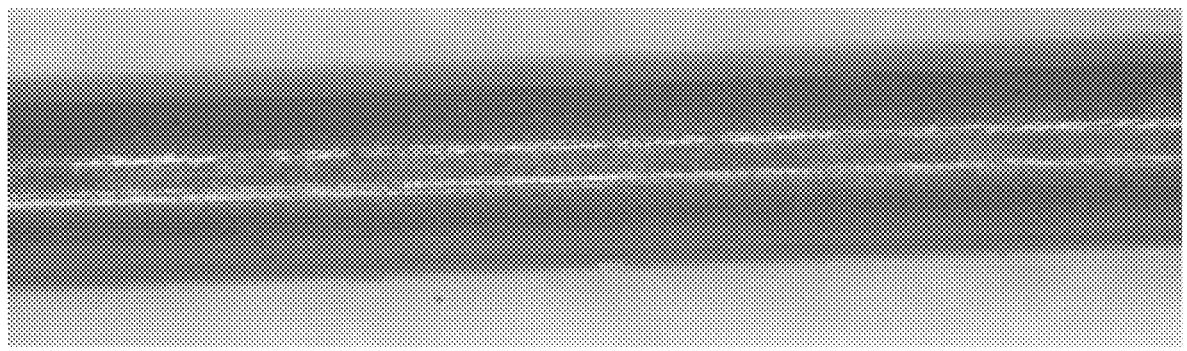
FIG. 12a and FIG. 12b are photographs of undamaged optical fibers after separation from an optical-fiber ribbon according to an exemplary embodiment of the present invention.
Figure 12B:
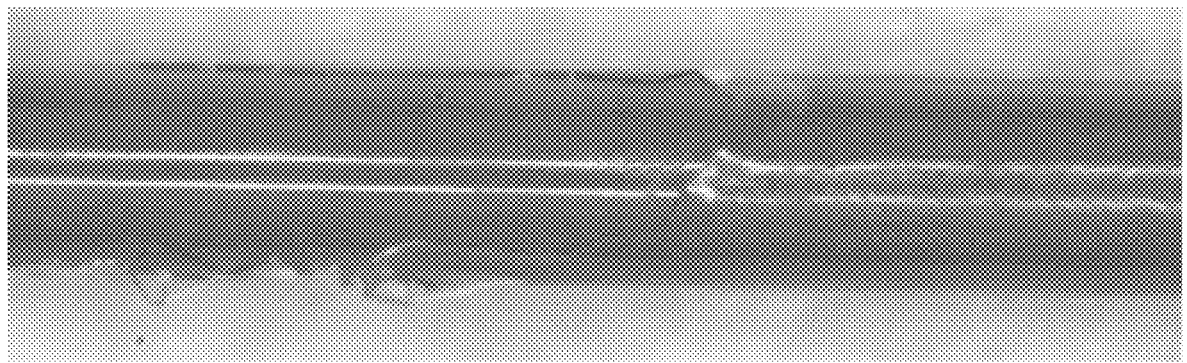

By way of illustration, FIG. 12a and FIG. 12b are photographs of an undamaged optical fiber after separation from an optical-fiber ribbon. This optical fiber includes, from its center to its periphery, a glass core, a glass cladding, a primary coating, a secondary coating, an ink layer, and a sacrificial, outer release layer formed of a cured first curable resin. Here, the points of failure when removing the optical fiber from the optical-fiber ribbon appear to have occurred both within the outer layer (i.e., formed by the first curable resin as cured) and at the interface between the outer layer (i.e., formed by the first curable resin as cured) and the optical fiber's ink layer. This shows the sacrificial outer layer (i.e., formed by the first curable resin as cured) is functioning as intended. Moreover, the sacrificial outer layer showed a high degree of strain-induced elasticity by the tear force during the T-peel test, which allowed the material to withstand a large degree of elongation before break. This flexibility also facilitates robustness due to increased fracture toughness of the outer layer (i.e., formed by the first curable resin as cured).

Figure 13A:
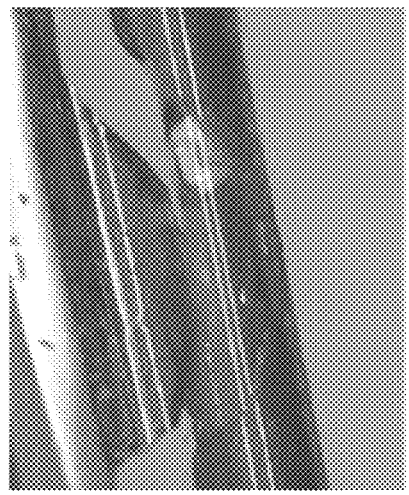
FIG. 13a and FIG. 13b are photographs of damaged optical fibers after separation from a comparative optical-fiber ribbon.
Figure 13B:
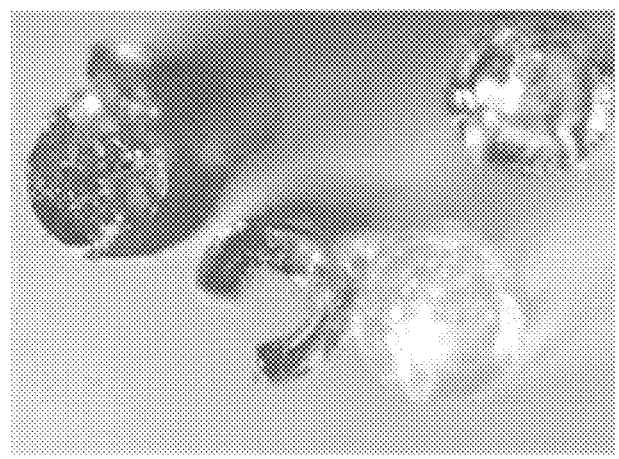

In contrast, FIG. 13a and FIG. 13b are photographs of damaged optical fibers after separation from a comparative optical-fiber ribbon. This comparative optical fiber also includes, from its center to its periphery, a glass core, a glass cladding, a primary coating, a secondary coating, an ink layer, and a comparative outermost layer formed of a cured first curable resin. Without being bound to any theory (and with reference to FIGS. 13a and 13b), excessive bond strength between the first curable resin and the second curable resin (and the correspondingly high peeling force required to separate the optical fibers) has resulted in not only separation of the ink layer from a secondary coating but also separation of the primary coating from the glass cladding, thereby exposing bare glass. By controlling the bonding strength between the bead (e.g., formed by the second curable resin) and the outer layer (e.g., formed by the first curable resin), an acceptable balance may be achieved between the robustness of the optical-fiber ribbon, which is important during the cabling process, and the ease by which individual optical fibers can be separated from the optical-fiber ribbon without damaging the optical fiber's structural portions, namely the glass core, the glass cladding, the primary coating, the secondary coating, and the optional ink layer, if present.

In an alternative optical-fiber-ribbon embodiment, each optical fiber may include, from its center to its periphery, a glass core, a glass cladding, a primary coating, and an outer layer formed of a cured first curable resin. In this optical-fiber embodiment, the cured first curable resin can be a secondary coating (e.g., a colored secondary coating contiguously surrounding the primary coating) or an ink layer (e.g., a colored ink layer contiguously surrounding a secondary coating).

Figure 15:
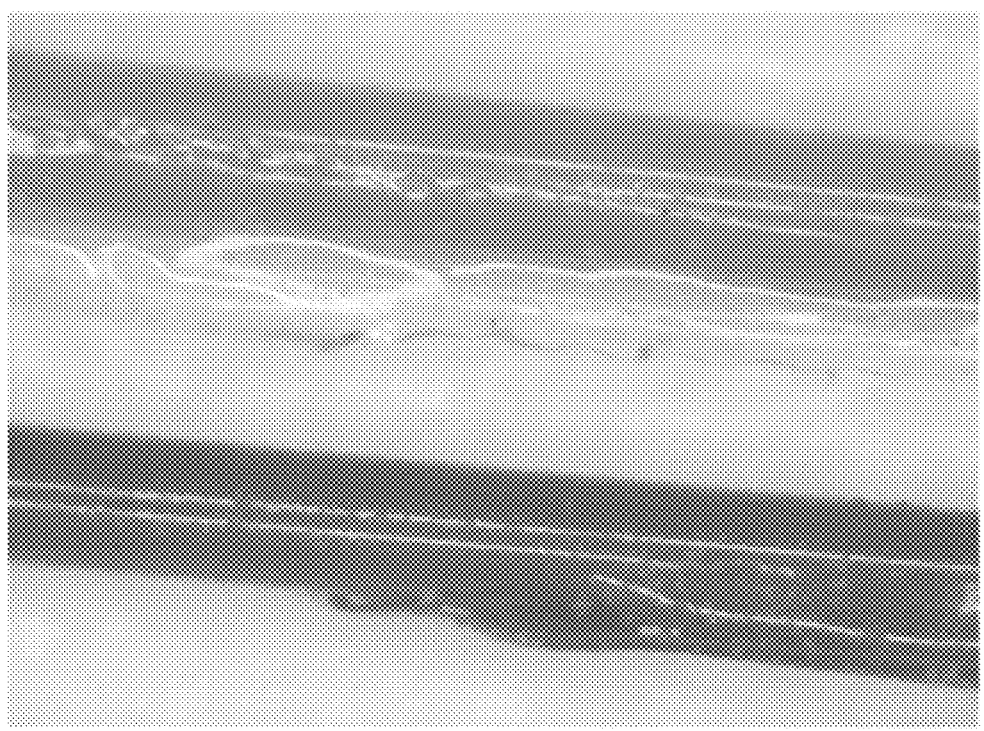
FIG. 15 is a photograph of undamaged optical fibers after separation from an optical-fiber ribbon according to an exemplary embodiment of the present invention.

By way of illustration, FIG. 15 is a photograph of undamaged optical fibers after separation from an exemplary optical-fiber ribbon during a T-peel test (e.g., to evaluate optical-fiber breakout). These optical fibers, which omit a sacrificial, outer release layer, each include, from its center to its periphery, a glass core, a glass cladding, a primary coating, a secondary coating, and an ink layer formed of a cured first curable resin. As shown in FIG. 15, the point of failure when removing the optical fibers from the exemplary optical-fiber ribbon occurred both (i) at the interface of the bead, which is formed from the cured second curable resin, and the ink layer, which is the outermost optical-fiber layer formed from the cured first curable resin, and (ii) more generally within the bead itself.

During breakout of the optical fibers from an optical-fiber ribbon, the structural components (e.g., the optical-fiber coatings) of the optical fibers should remain undamaged. For example, during optical-fiber breakout there should be no ink transfer to the bead, which is formed by the bonding material (e.g., the cured second curable resin). Internal failure of the bead during fiber breakout ensures no damage occurs to the optical fibers. This kind of favorable separation of the T-peel test (e.g., within the bead) is considered to be a "cohesive break" (e.g., deemed "cohesive" failure mode). Whereas "cohesive" failure mode describes failure within the bead itself, "mixed" failure mode describes failure both within the bead (e.g., formed by the cured second curable resin) and at the interface of the bead and the outermost optical-fiber layer (e.g., formed from the cured first curable resin). In either "cohesive" or "mixed" failure mode, an exemplary bead is configured to fail internally at a load that is less than the load that would otherwise damage the optical-fiber coatings.

Figure 16:
FIG. 16 is a photograph of damaged optical fibers after separation from a comparative optical-fiber ribbon.

In contrast, FIG. 16 is a photograph of damaged optical fibers after separation from a comparative optical-fiber ribbon during a T-peel test (e.g., to evaluate optical-fiber breakout). These comparative optical fibers, which likewise omit a sacrificial, outer release layer, each include, from its center to its periphery, a glass core, a glass cladding, a primary coating, a secondary coating, and an ink layer formed of a cured first curable resin. As shown in FIG. 16, the point of failure occurred at least partly within or between the optical fiber's principal structural parts, such as between the secondary coating and the contiguously surrounding ink layer formed by the cured first curable resin (e.g., as indicated by ink transfer to the bead during optical-fiber breakout).

In accordance with one exemplary method, manufacturing costs are reduced by making an optical-fiber ribbon having optical fibers in which the first curable resin is either a secondary coating (e.g., a colored secondary coating contiguously surrounding the primary coating) or an ink layer (e.g., a colored ink layer contiguously surrounding a secondary coating). That is, optical fibers that omit a sacrificial, outer release layer cost less to manufacture. Without being bound to any theory, using a lower modulus matrix material and controlling the curing conditions (e.g., UV power and curing environment) with respect to the optical fiber's outermost layer formed by a first curable resin achieve an optical-fiber ribbon possessing satisfactory robustness, satisfactory aging, and no undesirable ink transfer to the bead during optical-fiber breakout.

Without being bound by theory, UV curing of the optical fiber's coating layers should provide a surface-bond penetration that exceeds the depth of the ink layer, the secondary coating, and the primary coating (or the secondary coating and the primary coating in the absence of an optional ink layer) to create a strong combined shell around the glass cladding and core. This facilitates bonding of the optical fiber's outermost layer (e.g., the ink layer or the secondary coating, respectively) to the next outermost layer (e.g., the secondary coating or the primary coating, respectively). In one exemplary optical-fiber embodiment, the bond between the secondary coating and the surrounding, contiguous outermost ink layer should be stronger than the bond between the outermost ink layer and the bead, which is formed by the cured, second curable resin. In another exemplary optical-fiber embodiment, the bond between the primary coating and the surrounding, contiguous secondary coating should be stronger than the bond between the outermost secondary coating and the bead, which is formed by the cured, second curable resin.

Figure 17:
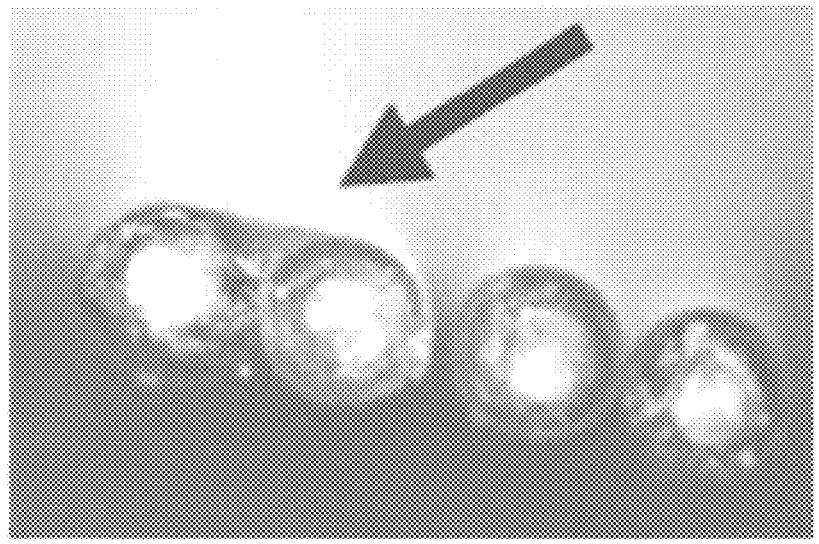
FIG. 17 is a photograph of an optical-fiber ribbon showing the cross-section of a surficial, elongated rectilinear bead between adjacent 250-micron optical fibers.
Figure 18:
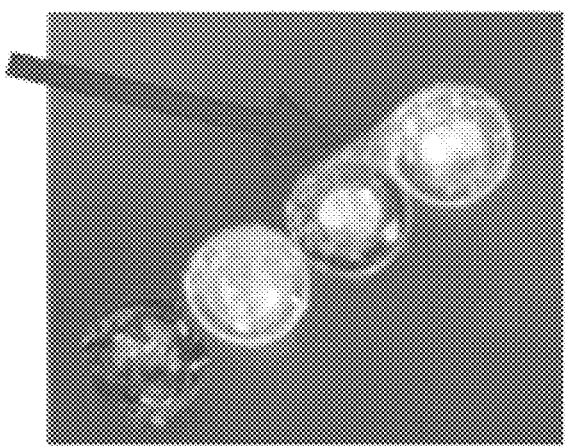
FIG. 18 is a photograph of an optical-fiber ribbon showing the cross-section of a surficial, elongated rectilinear bead between adjacent 200-micron optical fibers.

As noted, exemplary optical-fiber ribbons include surficial, elongated rectilinear beads configured to form bonds (e.g., elongated bonds) between adjacent optical fibers. An elongated bond between adjacent optical fibers in the optical-fiber assembly connects (e.g., chemically couples) each adjacent optical fiber's outermost layer (e.g., a secondary coating or an ink layer), which is formed of a cured first curable resin, and the corresponding bead, which is formed of a cured second curable resin. Exemplary optical-fiber ribbons with representative bead arrangements are depicted in FIGS. 2-6. FIG. 17 is a photograph showing a cross-section of a representative bead (e.g., a surficial, elongated rectilinear bead) for a portion of an optical-fiber ribbon formed using 250-micron optical fibers, and FIG. 18 is a photograph showing a cross-section of a representative bead (e.g., a surficial, elongated rectilinear bead) for a portion of an optical-fiber ribbon formed using 200-micron optical fibers. The respective cross-sectional areas of the beads can be approximated by 125-micron equilateral-triangle sides for the 250-micron optical fibers (e.g., about 0.0068 $mm^2$) and by 100-micron equilateral-triangle sides for the 200-micron optical fibers (e.g., about 0.0043 $mm^2$). With a +/−20 percent estimation of bead dimensions, the respective ranges for cross-sectional areas of the beads can be approximated by 100-micron to 150-micron equilateral-triangle sides for the 250-micron optical fibers (e.g., between about 0.0043 $mm^2$ and 0.0097 $mm^2$) and by 80-micron to 120-micron equilateral-triangle sides for the 200-micron optical fibers (e.g., between about 0.0028 $mm^2$ and 0.0062 $mm^2$).

For exemplary optical-fiber ribbons according to the present invention, the strength of the bond between each optical fiber's outermost ink layer and the corresponding bead is determined by the T-peel test for nominal 250-micron optical fibers. The respective breakout of each optical fiber was performed using a tensile tester (e.g., Instron 5567). For these 250-micron optical fibers, the exemplary bond strength (e.g., T-peel load) between an optical fiber's outermost ink layer and the bead (e.g., the corresponding bonding material) should be between about 0.02 N and 0.15 N. For the twelve differently colored optical fibers in the exemplary optical-fiber ribbons, the mean strength of the bond between the optical fiber's outermost ink layer and the bead was between about 0.07 N and 0.08 N with a standard deviation of less than 0.05 N. Accordingly, the bond strength between the secondary coating and the surrounding, contiguous outermost ink layer should exceed 0.15 N to provide "cohesive break" (i.e., with no ink transfer from the optical fiber to the bead). Similar assessment with respect to the bond strength between the primary coating and the secondary coating applies to optical-fiber embodiments in which a secondary coating (e.g., a colored secondary coating) is the outermost optical-fiber layer.

For nominal 200-micron optical fibers, the exemplary bond strength between the optical fiber's outermost ink layer and the bead (e.g., the corresponding bonding material) should be between about 0.015 N and 0.10 N, and the bond strength between the secondary coating and the surrounding, contiguous outermost ink layer should exceed 0.10 N to provide "cohesive break" (i.e., with no ink transfer from the 200-micron optical fiber to the bead). Similar assessment with respect to the bond strength between the primary coating and the secondary coating applies to optical-fiber embodiments in which a secondary coating (e.g., a colored secondary coating) is the outermost optical-fiber layer. The lesser bond strength (e.g., maximum T-peel load) between a 200-micron optical fiber's outermost ink layer and the bead corresponds to the reduced dimension (e.g., reduced surface contact) as compared with a similar 250-micron optical fiber.

Figure 19:
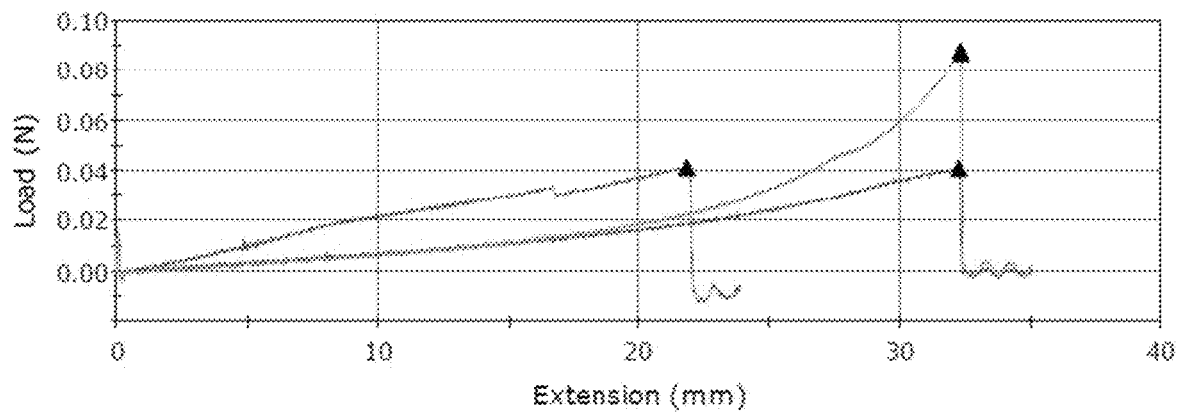
FIG. 19 depicts exemplary load-elongation curves in which nominal 250-micron optical fibers are separated from an optical-fiber ribbon according to an exemplary embodiment of the present invention.

Testing has indicated the energy to achieve favorable "cohesive break" within the bead should be about 0.4 millijoule (mJ) or less during breakout of the optical fibers from the optical-fiber ribbon. FIG. 19 provides exemplary load-elongation curves for a T-peel test in which nominal 250-micron optical fibers are separated from an exemplary optical-fiber ribbon without incurring damage to the principal structural parts of the optical fibers. The energy-to-break is determined by the area under a corresponding load-elongation curve. Here, a clean "cohesive break" within a bead ensured that no ink transfer to the bead occurred during optical-fiber breakout, such as shown in FIG. 15. FIG. 19 shows a sharp reduction of the load to near-zero at cohesive failure within the bead and illustrates a successful optical-fiber breakout solution, such as characterized by the sudden, vertical load reduction.

Figure 20:
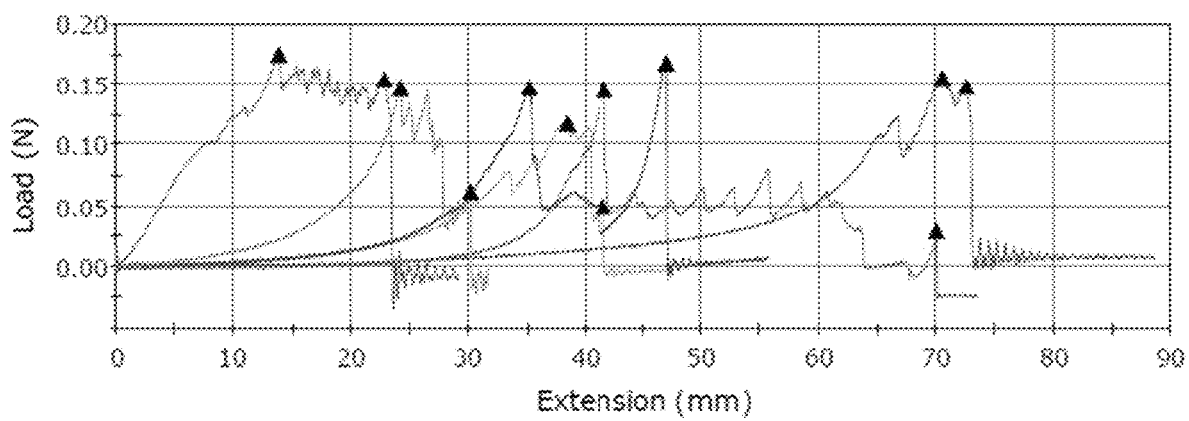
FIG. 20 depicts comparative load-elongation curves in which nominal 250-micron optical fibers are separated from a comparative optical-fiber ribbon.

In contrast, a poor optical-fiber breakout solution is sometimes characterized by irregular break behavior, which corresponds to higher energy-to-break (e.g., greater than 0.5 mJ for ribbonized 250-micron optical fibers). FIG. 20 provides comparative load-elongation curves for a T-peel test in which nominal 250-micron optical fibers are separated from a comparative optical-fiber ribbon, causing damage to the principal structural parts of the optical fibers. Here, the point of failure occurred at least partly within or between an optical fiber's principal structural parts, such as between the secondary coating and the contiguously surrounding ink layer formed by the cured first curable resin, such as shown in FIG. 16. The testing shown in FIG. 20 indicates energy to break the bonds between the ink layer and the bead (the "energy-to-break") to range between about 0.65 mJ and 1.26 mJ.

Figure 21:
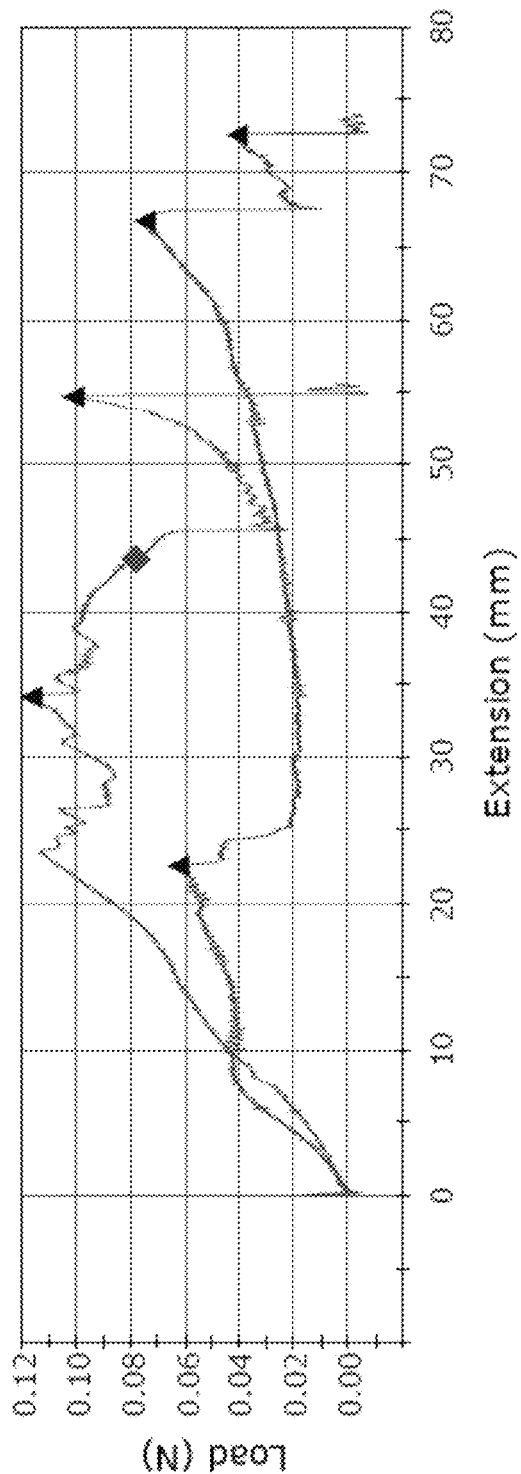
FIG. 21 depicts comparative load-elongation curves in which nominal 200-micron optical fibers are separated from a comparative optical-fiber ribbon.

FIG. 21 similarly provides comparative load-elongation curves for a T-peel test in which nominal 200-micron optical fibers are separated from an optical-fiber ribbon in a way that damages the principal structural parts of the optical fibers. This is illustrated in FIG. 21 by the erratic, indistinct break behavior, which corresponds to higher energy-to-break. As with optical-fiber ribbons formed with 250-micron optical fibers, optical-fiber ribbons formed with 200-micron optical fibers appear to achieve favorable "cohesive break" within a bead if the energy-to-break is about 0.4 millijoule (mJ) or less during optical-fiber breakout (e.g., the energy to sever the bonds between the bead and the optical fiber's outermost layer).

Without being bound to any theory, FIG. 20 and FIG. 21 suggest the strength of the bonds between each optical fiber's outermost ink layer and the bead is greater than the bond strength between the secondary coating and the surrounding, contiguous outermost ink layer. As such, the locus of failure is not constrained to the bead, and so the break-out damage can propagate to the optical-fiber coatings and optical-fiber coating interfaces. As illustrated in FIG. 20, propagation of the failure locus creates greater damage area, which corresponds to energy-to-break (e.g., greater than 0.5 mJ for ribbonized 250-micron optical fibers) as indicated by the greater area under the load-elongation curves.

Figure 22:
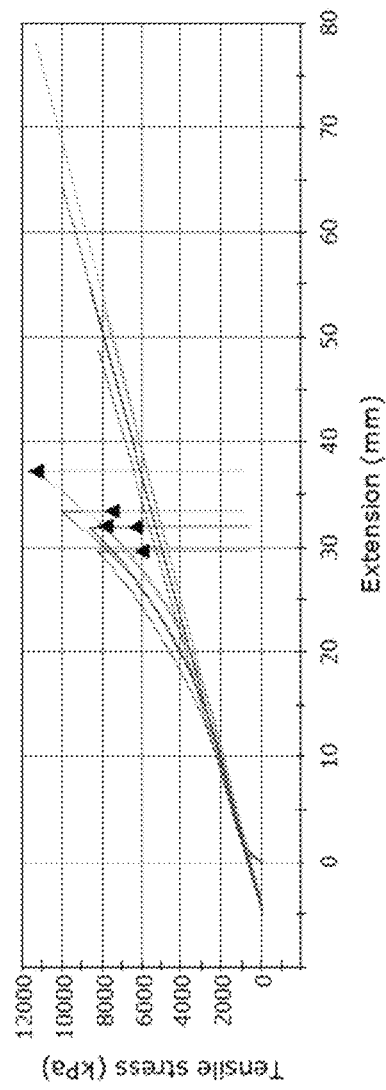
FIG. 22 depicts stress-strain curves for a test sample of an exemplary bonding material substantially fully cured to a curing degree of 95 percent or more.

As noted, a representative bonding material (e.g., a cured second curable resin) has an elongation at break of at least 150 percent (e.g., between about 200 percent and 300 percent), and a modulus of elasticity (or Young's modulus) of between 1 MPa and 20 MPa (e.g., between about 1 MPa and 10 MPa). As an optical-fiber-ribbon bonding material (e.g., a bead), the cured second curable resin may be partly cured to a curing degree of between 85 percent and 95 percent or substantially fully cured to a curing degree of 95 percent or more as determined using Fourier Transform Infrared (FTIR) of the peak of the chemically active group of the resin (e.g., a peak of a chemically active group, such as $810 \text{ cm}^{-1}$ or about $1405 \text{ cm}^{-1}$ to $1410 \text{ cm}^{-1}$, such as with respect to the acrylate group for a UV-curable acrylate resin). FIG. 22 provides stress-strain curves for a dog-bone-shaped sample of a bonding material (e.g., a second curable resin) substantially fully cured to a curing degree of 95 percent or more. Here, the load-elongation behavior shows a sharp, clean fracture with an energy per unit volume (e.g., intrinsic material toughness) of about 20 $mJ/mm^3$ or less (e.g., between 5 $mJ/mm^3$ and 20 $mJ/mm^3$), such as about 15 $mJ/mm^3$ or less (e.g., about 10 $mJ/mm^3$). Toughness is an intrinsic material property measured on a material sample with a known geometry, such as dog-bone-shaped film sample according to ASTM D638 Type I, II, III, IV, or V, each of which is hereby incorporated by reference. The intrinsic material toughness reflects the energy to break (e.g., the area under a corresponding load-elongation curve) divided by the specimen volume (e.g., the volume of the reduced-area section of the dog-bone shaped film). The stress-strain curve depicted in FIG. 22 was generated from testing of a dog-bone-shaped film sample according to ASTM D638 Type V, such as using the following method: ASTM D638-14 ("Standard Test Method for Tensile Properties of Plastics").

In exemplary embodiments, the bead of the cured second curable resin positioned in situ on an optical-fiber ribbon reflects these bonding-material properties. For example, a representative cured second curable resin forming the beads typically demonstrates stress at break (i.e., force per unit area, such as load per bead cross-section) of less than about 150 MPa (e.g., between 20 MPa and 150 MPa), such as less than 120 MPa (e.g., 30 MPa to 110 MPa, such as 50 MPa to 90 MPa), as measured on a dog-bone-shaped film sample using the following method: ASTM D638-14 ("Standard Test Method for Tensile Properties of Plastics"). As noted, FIG. 17 is a photograph showing a cross-section of a representative bead (e.g., a surficial, elongated rectilinear bead) for a portion of an optical-fiber ribbon formed using 250-micron optical fibers, and FIG. 18 is a photograph showing a cross-section of a representative bead (e.g., a surficial, elongated rectilinear bead) for a portion of an optical-fiber ribbon formed using 200-micron optical fibers.

Table 1 (below) shows mechanical properties of an exemplary bonding material (e.g., a substantially cured second curable resin, such as about 98 percent cured) and a comparative bonding material (e.g., about 98 percent cured). As noted, the bonding material is the bead material that forms bonds (e.g., elongated rectilinear beads) between adjacent optical fibers in the optical-fiber assembly. An exemplary bonding material facilitates "cohesive breakout," whereas the comparative bonding material causes damage to the principal structural parts of the optical fibers (e.g., damage to the ink layer and secondary coating).

TABLE 1

|  | Strain at Break (%) | Stress at Break (MPa) | Young's Modulus (MPa) | Toughness ($mJ/mm^3$) |
| --- | --- | --- | --- | --- |
| Exemplary Bonding Material ("cohesive break") | 199 | 110 | 23.3 | 12.4 |
| Comparative Bonding Material | 302 | 180 | 143 | 31.9 |

Figure 23:
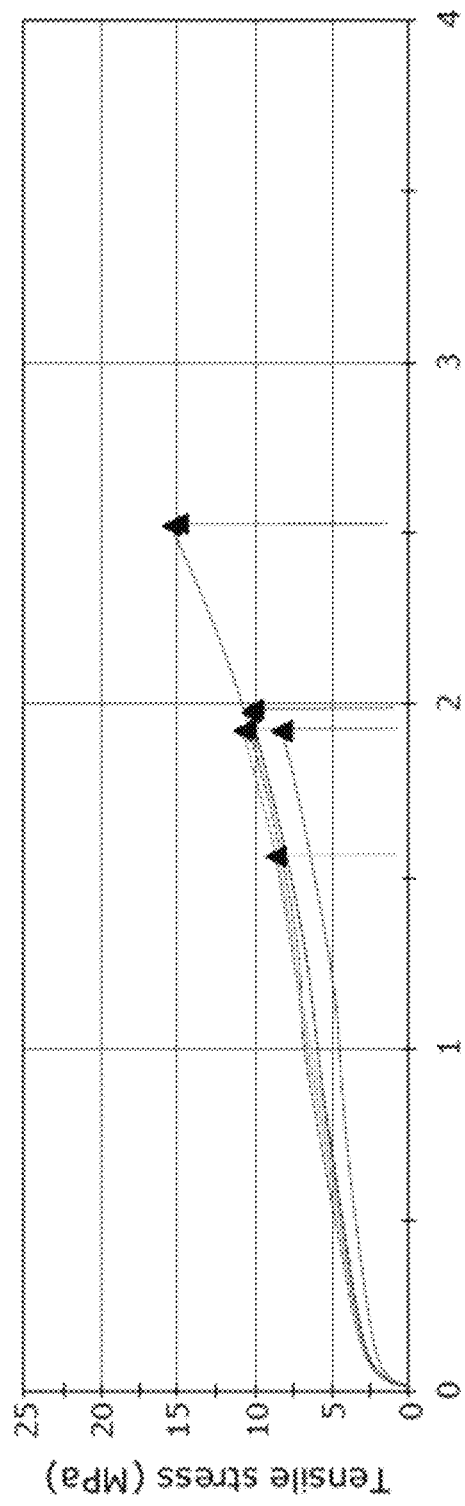
FIG. 23 depicts stress-strain curves for a test sample of an exemplary bonding material.
Figure 24:
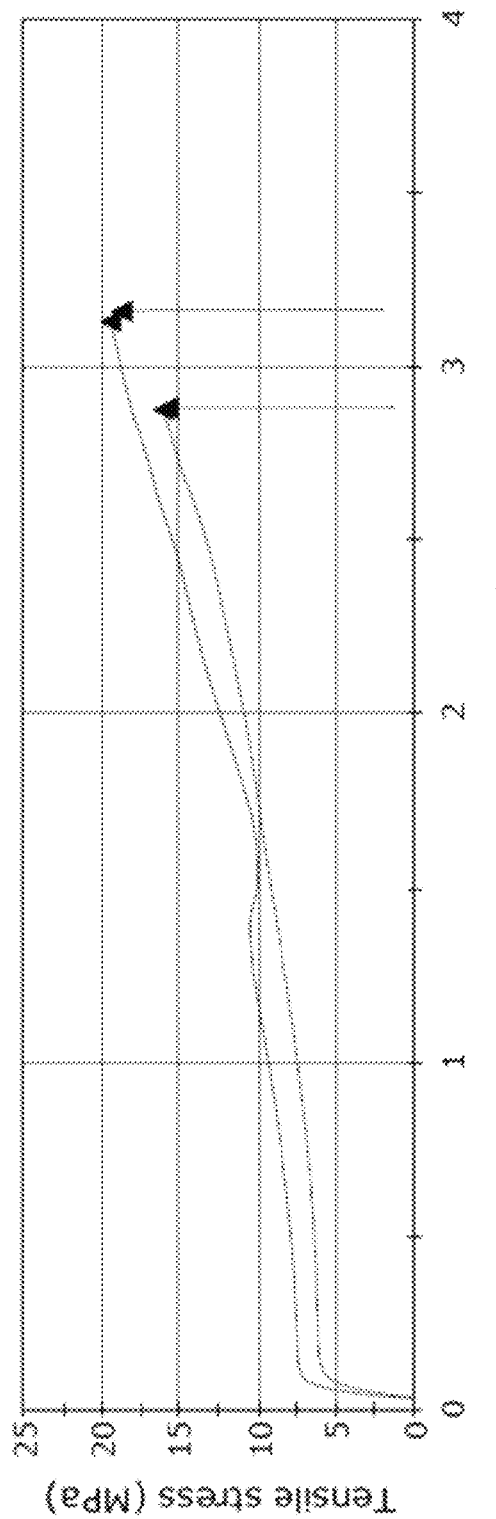
FIG. 24 depicts stress-strain curves for a test sample of a comparative bonding material.

FIG. 23 depicts stress-strain curves for a test sample of the exemplary bonding material (e.g., a substantially cured second curable resin). FIG. 24 is a stress-strain curve for a test sample of the comparative bonding material (e.g., a comparative, substantially cured second curable resin). The stress-strain curves depicted in FIGS. 23-24 were generated from testing of dog-bone-shaped film samples according to ASTM D638 Type V.

In an exemplary embodiment, a first bead forming a first bond connects a first pair of adjacent optical fibers while a successive bond formed by a successive bead connects a further pair of adjacent optical fibers. Here, at least one optical fiber of the further pair of adjacent optical fibers differs from the optical fibers of the first pair of adjacent optical fibers. In an exemplary embodiment, at each longitudinal position of the optical-fiber assembly (e.g., along the resulting optical-fiber ribbon), there is at most one bond.

In a first example of this embodiment, the beads will have a stepwise pattern. In an exemplary embodiment, at an end of the stepwise pattern of beads, the bead that follows the last bead of the pattern starts a subsequent stepwise pattern in the same width direction. Typically, the successive stepwise patterns are free from each other in that no cured second curable resin connects the two stepwise patterns. This succession of stepwise patterns may be repeated, typically over the length of the optical fibers, to form a saw-tooth-like arrangement over the plurality of fibers, (in a plan view). In an exemplary embodiment of this saw-tooth like arrangement, the pitch (P) (i) is equal to the recurrence of the stepwise pattern in the same width direction and (ii) is between 10× and 100× the width (W) of the optical-fiber assembly, typically between 15× and 80× the width (W) of the optical-fiber assembly.

Figure 4A:
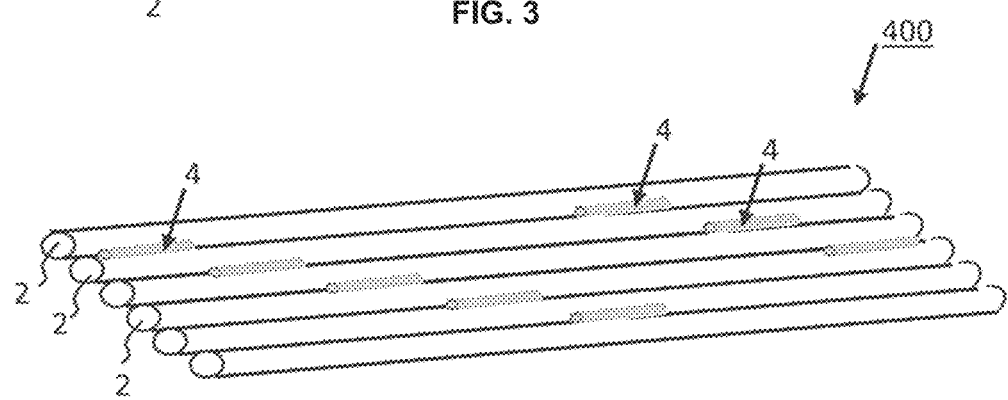
FIG. 4a depicts in a perspective view an exemplary embodiment of an inventive optical-fiber ribbon having an intermittent, discontinuous saw-tooth like arrangement.
Figure 4B:
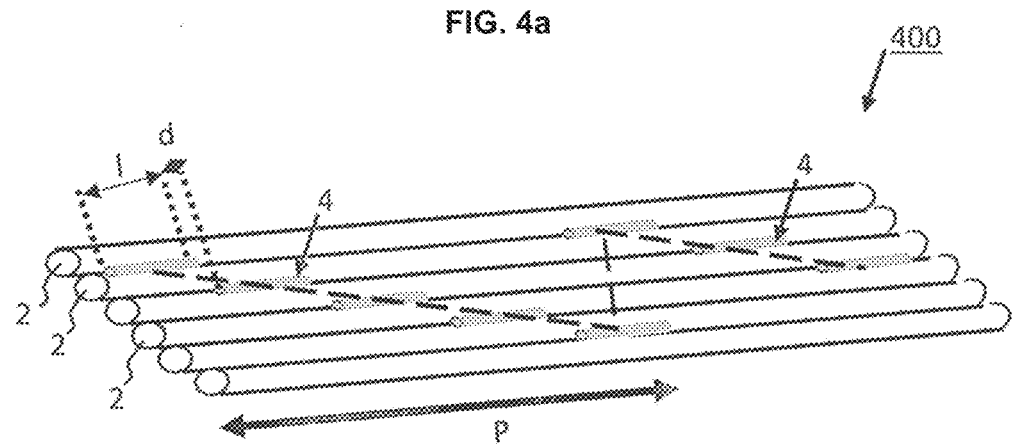
FIG. 4b depicts the exemplary embodiment of FIG. 4a with a fitted saw-tooth line and pitch.

FIGS. 4a and 4b depict an exemplary embodiment of an optical-fiber ribbon 400 having a saw-tooth like arrangement in which none of the beads 4 are connected and the plurality of beads is arranged as a discontinuous line. The saw-tooth like arrangement has a constant repetition that follows the trace of a saw tooth wave with a pitch (P) as illustrated in FIG. 4b.

Figure 5:
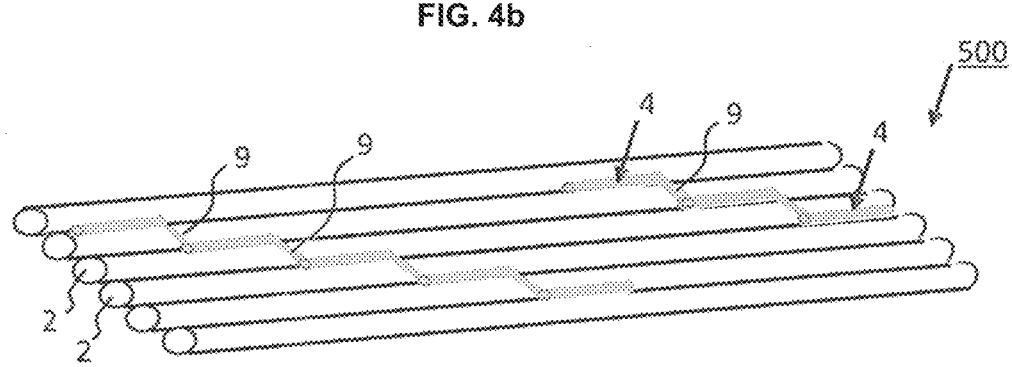
FIG. 5 depicts in a perspective view an exemplary embodiment of an inventive optical-fiber ribbon having a partly continuous saw-tooth like arrangement.

FIG. 5 discloses an exemplary embodiment of an optical-fiber ribbon 500 having a saw-tooth like arrangement. The plurality of beads 4 is arranged as a partly continuous line of the second curable resin. The continuous line starts with a first bead 4 being applied between the first and second optical fibers 2 at the distant edge. This continuous line continues over the top of the second optical fiber, with a transition part 9, to the groove between the second and third optical fibers, and further on over the top of the third optical fiber, with a transition part 9, to the groove between the third and fourth optical fibers, and so on and so on. The continuous line ends in the groove between the fifth and sixth (nearest) optical fibers. A new continuous line starts in the groove between the first and second optical fibers at a pitch P from the first continuous line (such as illustrated in FIG. 4b).

Figure 6:
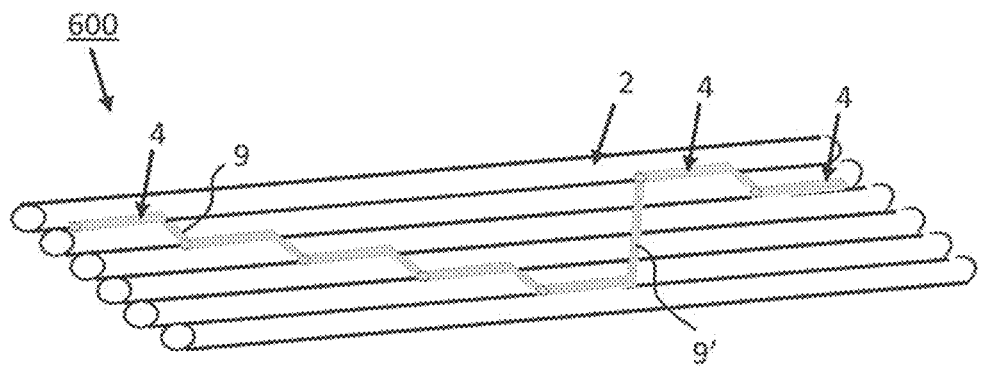
FIG. 6 depicts in a perspective view an exemplary embodiment of an inventive optical-fiber ribbon having a continuous saw-tooth like arrangement.

FIG. 6 discloses an exemplary embodiment of an optical-fiber ribbon 600 having a saw-tooth like arrangement. The plurality of beads is arranged as a continuous line of the second curable resin. The difference between the optical-fiber ribbon 600 depicted in FIG. 6 and the optical-fiber ribbon 500 depicted in FIG. 5 is a resin line 9' between the bead 4 between the fifth and sixth optical fibers 2 of the first saw-tooth like arrangement and the bead 4 between the first and the second optical fibers 2 of the second saw-tooth like arrangement.

In another exemplary embodiment with a stepwise pattern, a first stepwise pattern is formed in a first width direction and, at the end of the stepwise pattern, a further stepwise pattern in the opposite direction is formed. This succession of stepwise patterns may be repeated, typically over the length of the optical fibers, thereby forming a zig-zag like arrangement over the plurality of optical fibers (in a plan view). The plurality of beads is provided so the plurality of respectively adjacent optical fibers of the optical-fiber assembly, when the optical-fiber assembly is brought into a folded-out condition, extends in the same virtually flat plan. In an exemplary embodiment of this zig-zag like arrangement, the pitch (P) (i) is equal to the recurrence of the stepwise pattern in the same width direction and (ii) is between 14× and 140× the width (W) of the optical-fiber assembly, typically between 18× and 100× the width (W) of the optical-fiber assembly.

Figure 2A:
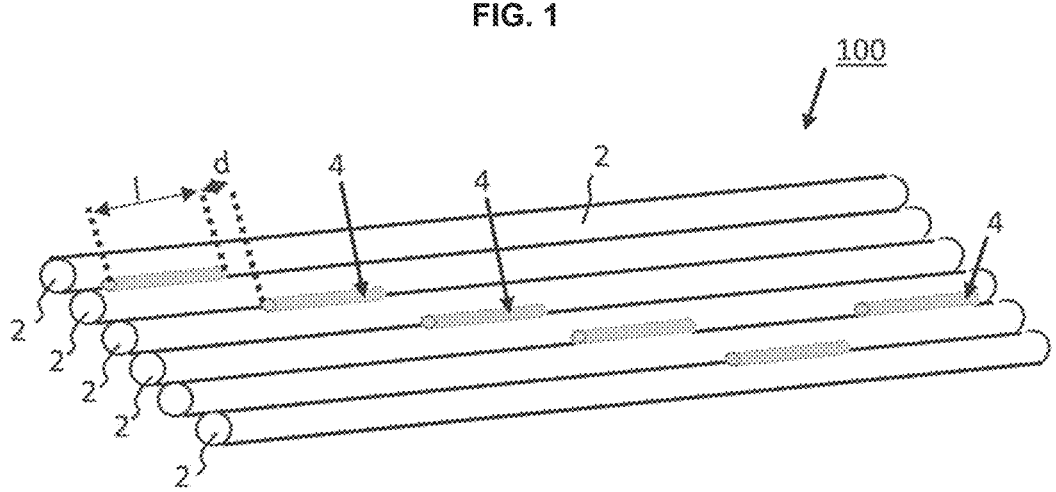
FIG. 2a depicts in a perspective view an exemplary embodiment of an inventive optical-fiber ribbon having an intermittent, discontinuous zig-zag like arrangement.
Figure 2B:
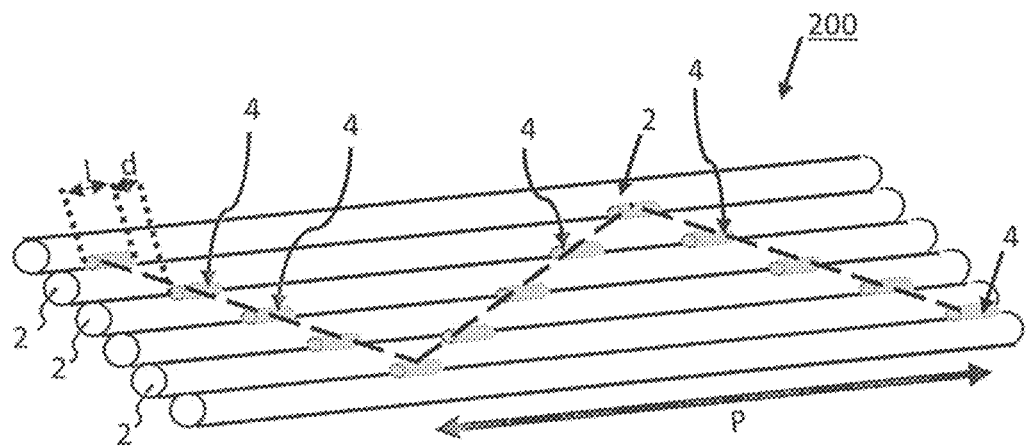

FIG. 2a discloses a first embodiment of an optical-fiber ribbon 100 having a zig-zag like arrangement. In this exemplary arrangement, none of the beads 4 are connected and the plurality of beads is arranged as a discontinuous line. FIG. 2b discloses a second embodiment of an optical-fiber ribbon 200 having a zig-zag like arrangement, the arrangement is shown by the black striped line connecting the middle points of the beads. The difference between the optical-fiber ribbon 200 depicted in FIG. 2b and the optical-fiber ribbon 100 depicted in FIG. 2a is the shorter bonding length (l). In this arrangement, none of the beads 4 are connected and the plurality of beads is arranged as a discontinuous line.

Figure 3:
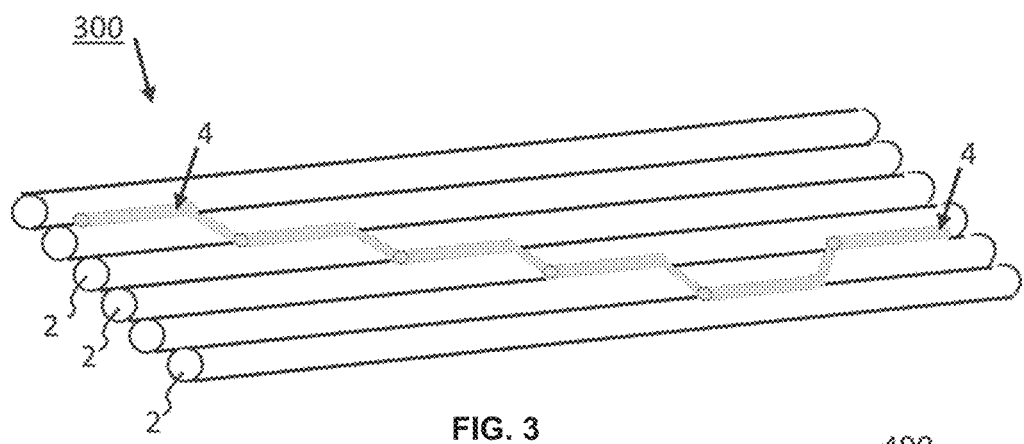
FIG. 3 depicts in a perspective view an exemplary embodiment of an inventive optical-fiber ribbon having a continuous zig-zag like arrangement.

FIG. 3 discloses a third embodiment of an optical-fiber ribbon 300 having a zig-zag like arrangement. The plurality of beads 4 is arranged as a continuous line of the second curable resin and having transition parts (e.g., in a similar manner as depicted in FIG. 5 and FIG. 6). The zig-zag like arrangement of the embodiments according to FIGS. 2a, 2b, and 3 has a constant repeated arrangement that follows the trace of a triangle wave with a pitch (P) as illustrated in FIG. 2b.

In an exemplary embodiment, the width (W) of the optical-fiber assembly is between about 2 millimeters and 10 millimeters (e.g., between 2 millimeters and 4 millimeters). The width (W) of the optical-fiber assembly is typically described as the number (N) of optical fibers each having a diameter (D), whereby $W=D\times N$. In practice, the optical fibers are substantially contiguous to one another, although some small gaps may exist between adjacent optical fibers.

In an exemplary embodiment, at a certain longitudinal position over the width (W) of the optical-fiber assembly, there is one bond. In an exemplary embodiment, at each longitudinal position over the width (W) of the optical-fiber assembly, there is one bond. In other words, at one certain longitudinal position there is only one bond between two optical fibers, and there is no bond present between another set of two adjacent optical fibers. This structure reduces the number of bonds and facilitates increased flexibility.

Figure 10:
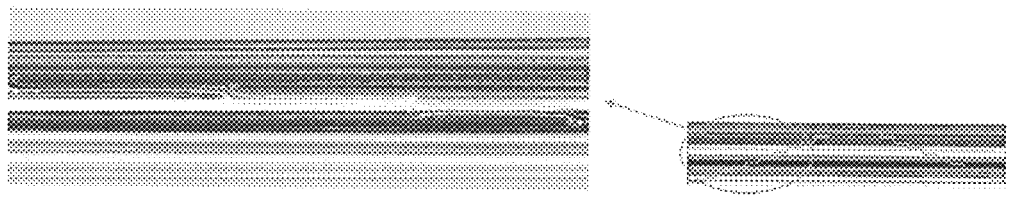
FIG. 10 is a plan-view photograph of an optical-fiber ribbon according to an exemplary embodiment of the present invention.

FIG. 10 is a plan-view photograph of an optical-fiber ribbon according to an exemplary embodiment, namely an optical-fiber ribbon having a zig-zag like arrangement with a continuous line of a cured resin.

Figure 11:
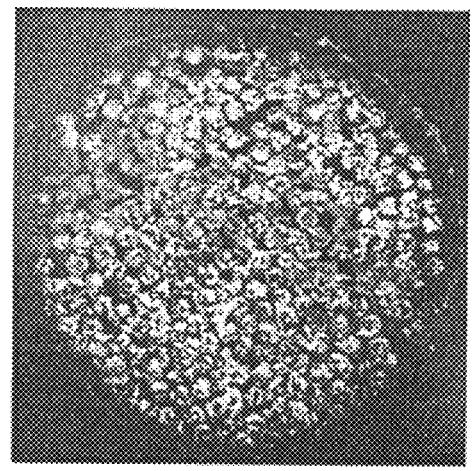
FIG. 11 is a cross-sectional photograph of an optical cable unit being prepared using 24 optical-fiber ribbons, each having 12 optical fibers.

The optical-fiber ribbon according to the present invention may be used to form optical-fiber-cable units and optical-fiber cables. An example of such an optical-fiber-cable unit is shown in FIG. 11. This exemplary optical-fiber-cable unit has 24 ribbons of 12 optical fibers each. This optical-fiber-cable unit packs 288 optical fibers into a high optical-fiber density. Accordingly, in another inventive aspect, the present invention embraces an optical-fiber-cable unit including one or more optical-fiber ribbons (also according to the present invention) surrounded by a polymeric sheath. The present invention further embraces an optical-fiber cable including one or more of the optical-fiber ribbons or optical-fiber-cable units according to the present invention.

As explained (above), the flexible optical-fiber ribbon according to the present invention facilitates mass-fusion splicing to make multiple optical-fiber connections while allowing optical fibers to be separated (e.g., peeled or otherwise removed) from the optical-fiber ribbon without damaging one or more optical fibers. According to exemplary embodiments herein disclosed, this can be achieved by coupling (e.g., chemical coupling) the beads to the outer layer of the optical fibers, thereby directing the point of failure during optical-fiber peel-off away from the optical fiber.

Other solutions providing similar results are also part of the present invention. For example, another solution is decreasing the amount of release agent that is present in the outer layer (e.g., the first curable resin), even when the outer layer is fully cured prior to the application of the beads (e.g., the second curable resin). This seems to shift the point of failure (i) to the interface between the bead and the outer layer, (ii) to the outer layer itself, or (iii) to the interface between the outer layer and the secondary coating layer (or an optional ink layer).

To supplement the present disclosure, this application incorporates entirely by reference the following commonly assigned patents, patent application publications, and patent applications: U.S. Pat. No. 7,623,747 for a Single Mode Optical Fiber; U.S. Pat. No. 7,889,960 for a Bend-Insensitive Single-Mode Optical Fiber; U.S. Pat. No. 8,145,025 for a Single-Mode Optical Fiber Having Reduced Bending Losses; U.S. Pat. No. 8,265,442 for a Microbend-Resistant Optical Fiber; U.S. Pat. No. 8,600,206 for a Reduced-Diameter Optical Fiber; U.S. Patent Application Publication No. US2018/0031792 (published Feb. 1, 2018), now U.S. Pat. No. 10,185,105; International Application No. PCT/EP2017/067454 (filed Jul. 11, 2017, and published as International Publication No. WO 2019/011417 A1); International Application No. PCT/EP2018/050898 (filed Jan. 15, 2018, and published as International Publication No. WO 2019/137627 A1); International Application No. PCT/EP2018/050899 (filed Jan. 15, 2018, and published as International Publication No. WO 2019/137628 A1).

Other variations of the disclosed embodiments can be understood and effected by those of ordinary skill in the art in practicing the present invention by studying the drawings, the disclosure, and the appended claims. In the claims, the word "comprising" does not exclude other elements or steps, and the indefinite article "a" or "an" does not exclude a plurality.

It is within the scope of this disclosure for one or more of the terms "substantially," "about," "approximately," and/or the like, to qualify each adjective and adverb of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents:

The invention claimed is:
1. An optical-fiber ribbon, comprising:
 (i) a plurality of respectively adjacent optical fibers extending in a longitudinal direction and arranged in parallel to form an optical-fiber assembly, wherein each optical fiber includes, from its center to its periphery, a glass core, a glass cladding, a primary coating, and an outermost secondary coating comprising a cured first curable resin; and
 (ii) a plurality of successive elongated rectilinear beads comprising a cured second curable resin arranged lengthwise along the optical-fiber assembly, wherein the beads are configured to form elongated bonds between adjacent optical fibers in the optical-fiber assembly;
 wherein, as measured by a T-peel test, the force required to separate one optical fiber from the optical-fiber ribbon is between 0.01 N and 0.2 N; and
 wherein, along at least a portion of the optical-fiber ribbon that includes successive elongated rectilinear beads, the beads are configured to fail internally at a load that is less than the load that would otherwise damage the optical fiber's primary coating and/or the optical fiber's outermost secondary coating during optical-fiber breakout.

2. The optical-fiber ribbon according to claim 1, wherein, as measured by a T-peel test, the force required to separate one 250-micron optical fiber from the optical-fiber ribbon is between 0.02 N and 0.15 N.

3. The optical-fiber ribbon according to claim 1, wherein, as measured by a T-peel test, the force required to separate one 200-micron optical fiber from the optical-fiber ribbon is between 0.015 N and 0.1 N.

4. The optical-fiber ribbon according to claim 1, wherein, as measured by a T-peel test, the energy to break the bonds between each adjacent optical fiber's outermost secondary coating comprising the cured first curable resin and the corresponding bead comprising the cured second curable resin is 0.4 millijoule or less.

5. The optical-fiber ribbon according to claim 1, wherein, after 30 days of immersion in 60° C. water, the optical-fiber ribbon maintains at least 70 percent of its original bonding strength as measured by a T-peel test.

6. The optical-fiber ribbon according to claim 1, wherein the cured second curable resin forming the beads has elongation at break of at least 150 percent as measured via ASTM D638-14.

7. The optical-fiber ribbon according to claim 1, wherein the cured second curable resin forming the beads has Young's modulus of between 1 MPa and 50 MPa as measured via ASTM D638-14.

8. The optical-fiber ribbon according to claim 1, wherein each elongated bond between adjacent optical fibers in the optical-fiber assembly chemically couples each adjacent optical fiber's cured first curable resin and the corresponding bead's cured second curable resin.

9. The optical-fiber ribbon according to claim 1, wherein:
 a first elongated rectilinear bead comprising a cured second curable resin is configured to form a first elongated bond connecting a first pair of adjacent optical fibers; and
 a second elongated rectilinear bead comprising a cured second curable resin is configured to form a second elongated bond connecting a second pair of adjacent optical fibers, wherein at least one optical fiber of the second pair of adjacent optical fibers differs from the optical fibers of the first pair of adjacent optical fibers.

10. An optical-fiber-cable unit comprising one or more optical-fiber ribbons according to claim 1.

11. An optical-fiber ribbon, comprising:
 (i) a plurality of respectively adjacent optical fibers extending in a longitudinal direction and arranged in parallel to form an optical-fiber assembly, wherein each optical fiber includes, from its center to its periphery, a glass core, a glass cladding, a primary coating, a secondary coating, and an outermost ink layer comprising a cured first curable resin; and
 (ii) a plurality of successive elongated rectilinear beads comprising a cured second curable resin arranged lengthwise along the optical-fiber assembly, wherein the beads are configured to form elongated bonds between adjacent optical fibers in the optical-fiber assembly;
 wherein, as measured by a T-peel test, the force required to separate one optical fiber from the optical-fiber ribbon is between 0.01 N and 0.2 N; and
 wherein, along at least a portion of the optical-fiber ribbon that includes successive elongated rectilinear beads, the beads are configured to fail internally at a load that is less than the load that would otherwise damage the optical fiber's primary coating, the optical fiber's secondary coating, and/or the optical fiber's outermost ink layer during optical-fiber breakout.

12. The optical-fiber ribbon according to claim 11, wherein, as measured by a T-peel test, the force required to separate one 250-micron optical fiber from the optical-fiber ribbon is between 0.02 N and 0.15 N.

13. The optical-fiber ribbon according to claim 11, wherein, as measured by a T-peel test, the force required to separate one 200-micron optical fiber from the optical-fiber ribbon is between 0.015 N and 0.1 N.

14. The optical-fiber ribbon according to claim 11, wherein, as measured by a T-peel test, the energy to break the bonds between each adjacent optical fiber's outermost ink layer comprising the cured first curable resin and the corresponding bead comprising the cured second curable resin is 0.4 millijoule or less.

15. The optical-fiber ribbon according to claim 11, wherein, after 30 days of immersion in 60° C. water, the optical-fiber ribbon maintains at least 70 percent of its original bonding strength as measured by a T-peel test.

16. The optical-fiber ribbon according to claim 11, wherein the cured second curable resin forming the beads has elongation at break of at least 150 percent as measured via ASTM D638-14.

17. The optical-fiber ribbon according to claim 11, wherein the cured second curable resin forming the beads has Young's modulus of between 1 MPa and 50 MPa as measured via ASTM D638-14.

18. The optical-fiber ribbon according to claim 11, wherein each elongated bond between adjacent optical fibers in the optical-fiber assembly chemically couples each adjacent optical fiber's cured first curable resin and the corresponding bead's cured second curable resin.

19. The optical-fiber ribbon according to claim 11, wherein:
a first elongated rectilinear bead comprising a cured second curable resin is configured to form a first elongated bond connecting a first pair of adjacent optical fibers; and
a second elongated rectilinear bead comprising a cured second curable resin is configured to form a second elongated bond connecting a second pair of adjacent optical fibers, wherein at least one optical fiber of the second pair of adjacent optical fibers differs from the optical fibers of the first pair of adjacent optical fibers.

20. An optical-fiber-cable unit comprising one or more optical-fiber ribbons according to claim 11.

* * * * *